(12) United States Patent
Barritz

(10) Patent No.: US 7,225,137 B1
(45) Date of Patent: May 29, 2007

(54) HARDWARE/SOFTWARE MANAGEMENT, PURCHASING AND OPTIMIZATION SYSTEM

(75) Inventor: Robert Barritz, New York, NY (US)

(73) Assignee: Isogon Corporation, New York, NY (US)

( * ) Notice: Subject to any disclaimer, the term of this patent is extended or adjusted under 35 U.S.C. 154(b) by 1176 days.

(21) Appl. No.: 09/389,858

(22) Filed: Sep. 2, 1999

Related U.S. Application Data

(60) Provisional application No. 60/099,629, filed on Sep. 8, 1998.

(51) Int. Cl.
  *G06F 17/60* (2006.01)
(52) U.S. Cl. ................. 705/1; 705/35; 714/26
(58) Field of Classification Search ............ 714/26; 705/1, 35, 26, 27, 28, 400; 709/202, 35
  See application file for complete search history.

(56) References Cited

U.S. PATENT DOCUMENTS

| | | | |
|---|---|---|---|
| 5,337,258 A | 8/1994 | Dennis | |
| 5,367,473 A | 11/1994 | Chu et al. | |
| 5,491,791 A | 2/1996 | Glowny et al. | |
| 5,515,524 A | 5/1996 | Lynch et al. ............... 395/500 |
| 5,590,056 A | 12/1996 | Barritz | |
| 5,754,763 A | 5/1998 | Bereiter | |
| 5,761,091 A | 6/1998 | Agrawal et al. | |
| 5,799,193 A | 8/1998 | Sherman et al. | |
| 5,813,012 A | 9/1998 | Chase et al. | |
| 5,845,078 A | 12/1998 | Tezuka et al. | |
| 5,872,909 A | 2/1999 | Wilner et al. | |
| 5,950,010 A | 9/1999 | Hesse et al. | |
| 6,041,182 A | 3/2000 | Hart et al. | |
| 6,059,842 A | 5/2000 | Dumarot et al. | |
| 6,138,139 A * | 10/2000 | Beck et al. ............. 709/202 |
| 6,144,954 A * | 11/2000 | Li ............................ 706/62 |

* cited by examiner

*Primary Examiner*—Elisca E. Pierre
(74) *Attorney, Agent, or Firm*—Ostrolenk, Faber, Gerb & Soffen, LLP

(57) ABSTRACT

The invention provides for tracking and day-to-day management of technical requirements, costs and environmental details of existing computer data centers, and the creation of scenarios for determining the optimum acquisition, expansion and reconfiguration strategies of the data centers as well as the forecasting of technical requirements, costs and environmental requirements of existing and proposed configurations of the data centers. A knowledge base comprises technical and financial specifications of various storage devices and other computer hardware as provided. A modeling tool allows for the creation of various "What-If" scenarios of possible data center configurations for long term projections of the technical and financial requirements of existing, modified or proposed data center configurations. The cost of individual devices, systems or data center locations, as well as the cost of proposed new equipment including software are tracked. Also provided is the ability to present technical, financial and other information of a data center of various levels, such as at the configuration, location, system and individual device levels, as well as the ability to prepare custom reports, tables and charts of the information.

59 Claims, 40 Drawing Sheets

View: Monthly Cost of Ownership ▼ [ ] items selected.

| | | | | | | | | | | | |
|---|---|---|---|---|---|---|---|---|---|---|---|
| NY - Madison Avenue | System A | DASD | IBM | 3380 | ak4 | $1,113.95 | $432.25 | $432.25 | $0.00 | $0.00 | $1,296.75 |
| NY - Madison Avenue | System A | Processor | IBM | ES/9000 | 9021-711 | $88,758.30 | $19,111.28 | $19,111.28 | $19,111.28 | $19,311.28 | $115,267.70 |
| NY - Madison Avenue | System A | Processor | IBM | ES/9000 | 9021-711 | $88,349.15 | $19,111.28 | $19,111.28 | $19,111.28 | $19,111.28 | $114,667.70 |
| NY - Wall Street | System A | Control Unit | MFX/Telex | 3898 | 2 | $670.73 | $681.38 | $681.38 | $681.38 | $681.38 | $4,088.28 |
| NY - Wall Street | System A | Processor | IBM | ES/9000 | 9221-191 | $1,194.54 | $1,213.50 | $1,213.50 | $1,213.50 | $1,213.50 | $7,281.00 |
| NY - Wall Street | System A | RAID | IBM | 9391 | A10 | $0.00 | $0.00 | $0.00 | $0.00 | $0.00 | $0.00 |
| NY - Wall Street | System A | RAID | STK | iceberg 9200 | a21 | $912.38 | $926.86 | $926.86 | $926.86 | $926.86 | $5,551.16 |
| NY - Wall Street | System B | Control Unit | STK | 4480 | M30 | $6,999.51 | $27,091.74 | $966.74 | $966.74 | $966.74 | $30,958.70 |
| NY - Wall Street | System B | DASD | IBM | 3380 | ak4 | $47.88 | $0.00 | $437.75 | $437.75 | $437.75 | $1,313.25 |
| NY - Wall Street | System B | DASD | IBM | 3390 | A34 | $4,201.82 | $15,932.78 | $932.78 | $932.78 | $932.78 | $19,663.90 |
| NY - Wall Street | System B | DASD | IBM | 3390 | A34 | $4,201.82 | $15,932.78 | $932.78 | $932.78 | $932.78 | $19,663.90 |
| NY - Wall Street | System B | DASD | IBM | 3390 | A34 | $4,201.82 | $15,932.78 | $932.78 | $932.78 | $932.78 | $19,663.90 |
| NY - Wall Street | System B | Processor | IBM | ES/9000 | 9021-711 | $53,245.10 | $194,723.75 | $19,473.75 | $19,473.75 | $19,473.75 | $272,618.80 |
| | | | | | Total | $288,891.09 | $42,013.80 | $440,357.26 | $66,652.26 | $66,857.76 | $66,857.76 | $749,596.64 |

HARDWARE/SOFTWARE MANAGEMENT, PURCHASING AND OPTIMIZATION SYSTEM

RELATED APPLICATIONS

This application claims the priority of Provisional Application Ser. No. 60/099,629, filed Sep. 8, 1998.

BACKGROUND OF THE INVENTION

The present invention relates to the management of the hardware and software of data centers and, more particularly, to the management of information about existing, planned or proposed hardware and software assets of the data centers.

Data center managers, capacity planners and financial planners are periodically required to evaluate the technical capabilities, financial requirements and environmental requirements of the hardware and software of computer data centers, networks, corporate IT assets and other collections of computer hardware and software. The term "data center" is meant here to be broad enough to encompass any or combinations of the foregoing. The managers and planners must also periodically determine whether or not to modify, upgrade or replace the existing hardware and software or whether to purchase additional hardware or software.

Typically, the only sources of information are from sales literature and from the sales representatives of new hardware and software products. The sales representatives are not likely to be familiar with the technical, financial and environmental requirements of existing data centers. The data center managers, capacity planners and financial planners thus do not presently have a good methodology for evaluating existing software and hardware, determining whether to purchase or lease new hardware and software, upgrade existing hardware and software or to dispose of existing hardware or software. There is currently no reliable methodology for determining the financial and environmental costs of such changes. Though spreadsheet products are currently available, the spreadsheets do not take into account all the parameters of existing data centers.

It is therefore desirable to provide an apparatus for and a method of tracking the technical specifications, costs and environmental details of existing data centers as well as for determining the optimum acquisition, expansion and reconfiguration strategies for the data centers.

SUMMARY OF THE INVENTION

The present invention provides for tracking and day-to-day management of technical requirements, costs and environmental details of existing data centers, and the creation of scenarios for determining the optimum acquisition, expansion and reconfiguration strategies of the data centers as well as the forecasting of technical requirements, costs and environmental requirements of existing and proposed configurations of the data centers.

The invention includes a knowledge base comprised of the technical and financial specifications of various storage devices and other software and hardware. A modeling tool allows for the creation of various "What-If" scenarios of possible data center configurations for making long term projections of the technical and financial requirements of existing, modified or proposed data center configurations. The costs of individual devices, systems or data center locations, as well as the costs of proposed new equipment are tracked.

The invention also includes the ability to present technical, financial and other information of a data center at various levels, namely at the configuration, location, system and individual device levels, and the ability to prepare custom reports, tables and charts of the information.

An aspect of the invention includes an apparatus for and a method of managing hardware and software of at least one data center. Information concerning a plurality of devices is stored. One or more configurations include at least one location, at least one system within the location, at least one device group within the system, and at least one device within a device group are stored. Information that is associated with each element of the configuration is correlated and stored. A display comprising at least a portion of the configuration and at least a portion of the associated information is generated.

In accordance with this aspect of the invention, the associated information may include financial information, technical information, or a summary of financial and technical information of at least one of the locations, systems, device groups and devices of the configuration. The associated information may include contact and lessor information or history information of a device. Table information of at least a portion of the associated information of selected locations, systems, device groups and devices over a selected time interval may be generated, and a chart representing the table information may likewise be generated. A report of at least a portion of the configuration of the associated information may be generated. The configuration and associated information and the information concerning the devices may be edited.

Another aspect of the invention includes a method of and an apparatus for adding a new location to a configuration of at least one data center. A new location transaction is selected, and a name of a new location within the configuration is entered.

A further aspect of the invention includes a method of and an apparatus for adding a new system to a configuration of at least one data center. A location within the configuration is selected, and the name of a new system within the location is entered.

A still further aspect of the invention includes a method of and an apparatus for adding a new device to a configuration of at least one data center. A desired device type is selected, and the system within the configuration within the desired device type is to be added is selected. The desired device type is added to the system, and a device model is assigned to the device type. Further associated information is assigned to the device model.

In accordance with this aspect of the invention, the further associated information may include one or more of financial information, technical information and custom information.

Yet another aspect of the invention includes a method of and an apparatus for updating information in a configuration of at least one data center. A device of a configuration that is to be updated is selected, and a portion of the associated information corresponding to the selected device is selected. The portion of the associated information is updated.

An additional aspect of the invention includes a method of and an apparatus for moving a device within a configuration of at least one data center. The device within a system of the configuration that is to be moved is selected, and another system to which the selected device is to be moved is selected. A date that the selected device is to be moved is selected.

A further additional aspect of the invention includes a method of and an apparatus for disposing of a device in a configuration of at least one data center. A device within the configuration that is to be disposed is selected, and a disposal date is selected.

Yet still another aspect of the invention includes a method of and an apparatus for modeling proposed changes to a configuration of at least one data center. An existing configuration is selected, and at least one modification to the existing configuration is performed. A modification date for the modification is selected.

In accordance with this aspect of the invention, the modifications may include adding at least one device to the selected configuration, moving at least one device within the selected configuration, and disposing of at least one device within the selected configuration. Another proposed configuration may be generated, and a table or a chart may be generated for comparing the proposed configurations.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which:

FIGS. 9A–9B shows an example of the technical specifications displayed when the technical tab of the information tabs of FIG. 7 is selected.

FIG. 10A shows an example of the summary, technical and financial specifications that are displayed when the summary tab of the information tabs of FIG. 7 is selected. FIG. 10B shows the contact and lessor information displayed when the contact/lessor tab of the information tabs of FIG. 7 is selected.

FIGS. 11A and 11B show examples of tables generated by the table generator of FIG. 1.

FIGS. 18A–18C show examples of displayed representations of steps in the operation of FIG. 17.

DETAILED DESCRIPTION OF THE INVENTION

Figure 1:
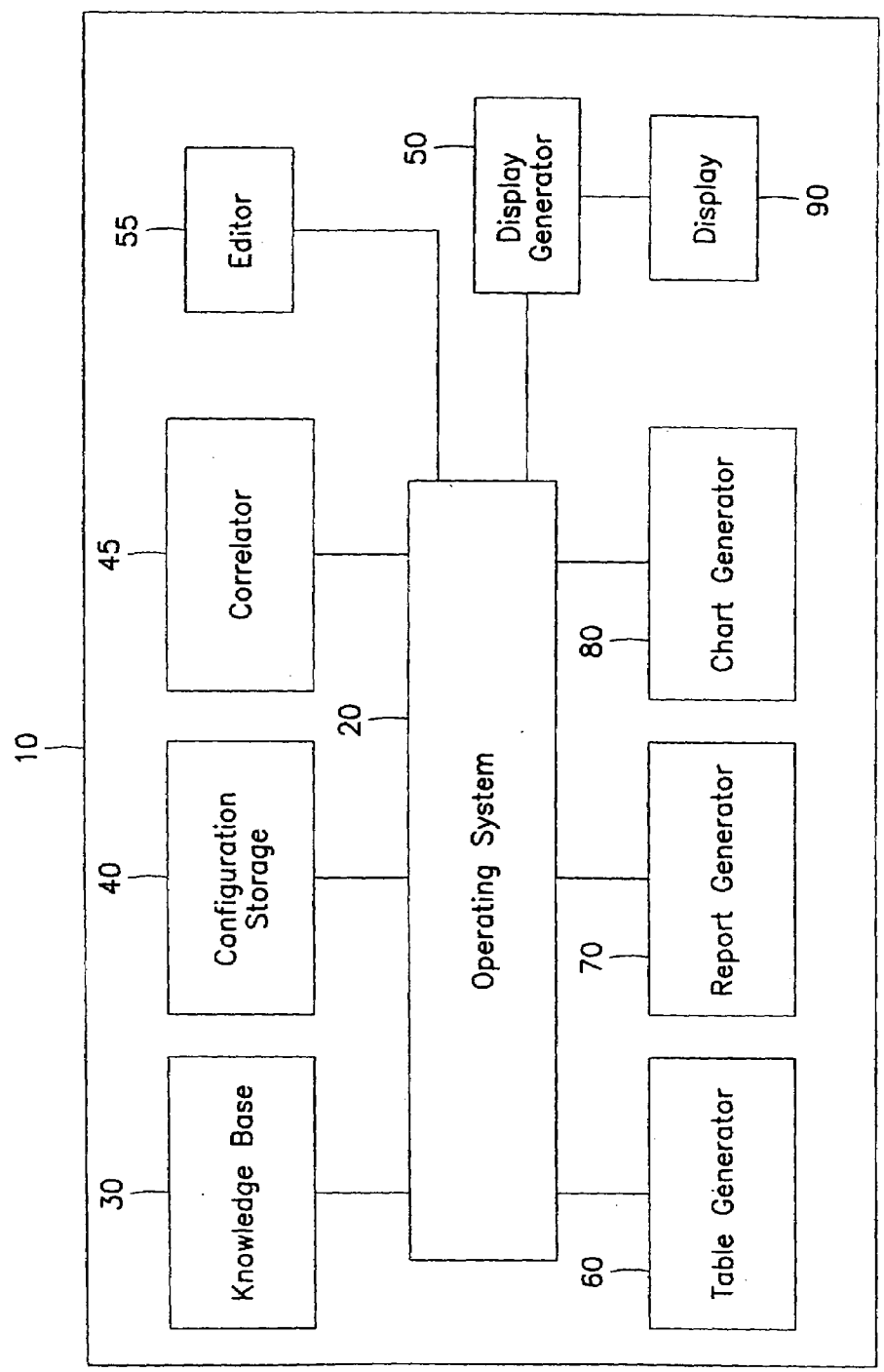
FIG. 1 is a block diagram showing a computer system in accordance with the present invention.

Referring first to FIG. 1, there is shown a computer system 10 in accordance with the invention with its various portions illustrated in block form. The computer system 10 includes an operating system 20, which may be a conventional operating system such as Windows 95, Window 98, Windows NT, or Windows 3.1x.

Also included are a knowledge base 30 for storing financial and technical information of various hardware devices and/or software products, a configuration storage 40 for storing one or more configuration trees representing existing and proposed configurations of the data centers, and a correlator 45 for correlating the financial and technical information stored in the knowledge base with the elements of the configuration trees for storage in the configuration storage. Further included are a table generator 60 for generating a table or grid displaying financial and summary information of one or more of the configurations or portions of configurations, a report generator 70 for generating a printed report of a configuration or a portion of a configuration, and a chart generator 80 for generating information generated by the table generator in graphic form. A display generator 50 generates a visual representation of, for example, part or all of a configuration stored in configuration storage 40 together with its associated information from the correlator 45 and the knowledge base 30 for a display 90. Additionally, grid information generated by the table generator 60 is formatted by the display generator 50. Alternatively, the representation of one or more charts generated by the chart generator 80 are formatted for display by the display generator.

Figure 2:
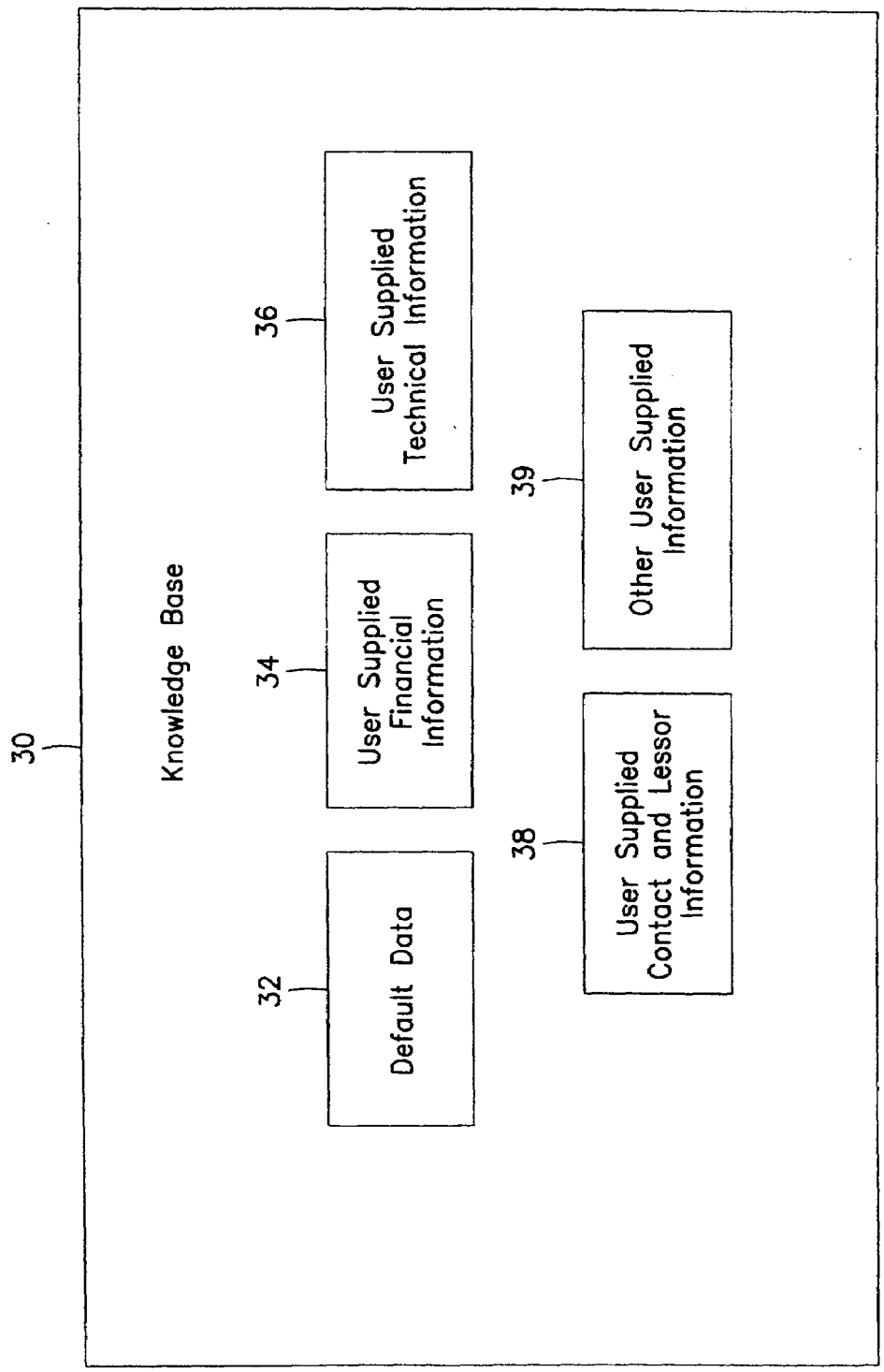
FIG. 2 is a block diagram showing the knowledge base of FIG. 1.

The knowledge base 30, shown in greater detail in FIG. 2, includes one or more databases of user supplied financial information 34 and user supplied technical information 36 of various devices. Also included in the knowledge base are user supplied contact and lessor information 38 for the devices and other user supplied information 39. Further included are default data 32 including financial and technical information of other devices not supplied by the user.

An editor 55, shown in FIG. 1, is included for modifying the user supplied information in the knowledge base and the configuration storage.

Figure 3:
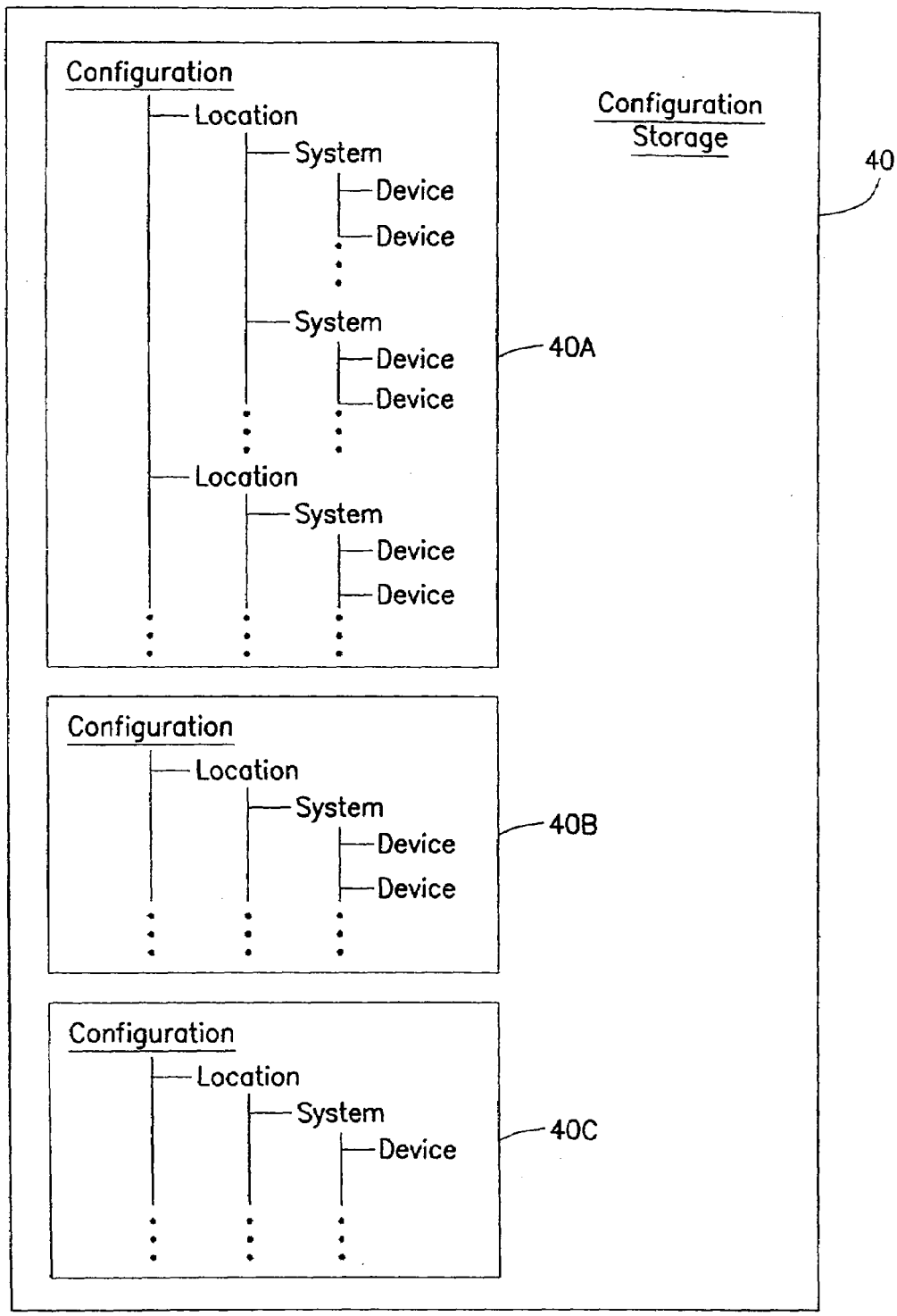
FIG. 3 is a block diagram showing the configuration storage of FIG. 1.

FIG. 3 shows, in greater detail, the configuration storage 40 which is comprised of one or more configurations 40A, 40B, 40C, . . . . Each configuration includes at least one data center location having at least one system which, in turn, includes at least one device group. Each device group, in turn, includes one or more devices. The configuration is stored in a tree data structure in which the highest level represents the respective configuration, the second level of the tree represents the data center locations within the configuration, the third level represents the systems within a respective location, the fourth level of the data structure represents the device groups within a respective system, and the fifth level represents the devices under a respective device group.

Figure 4A:
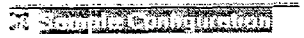
FIGS. 4A–4E show an example of the respective levels of a configuration stored in the configuration storage of FIG. 3.
Figure 4B:
Figure 4C:
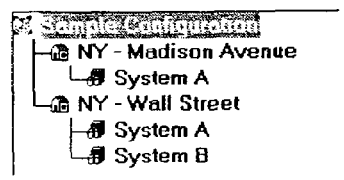
Figure 4D:
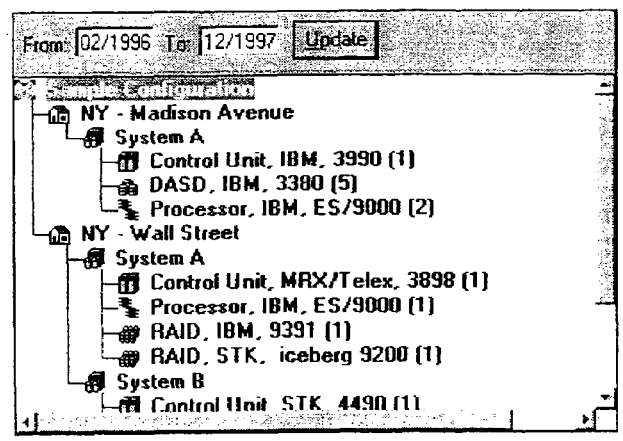
Figure 4E:
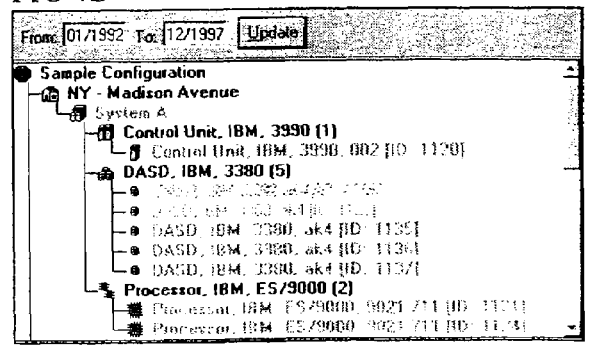

FIGS. 4A–4E show an example of a display of the respective levels of a configuration tree that are generated by the display generator 50. FIG. 4A shows a representation of the first level, namely the configuration, which is called in this example the Sample Configuration. FIG. 4B shows a representation of the first and second levels of the example, namely two data center locations within the Sample Configuration. FIG. 4C shows the first through third levels which includes the respective systems of each of the two locations, and FIG. 4D shows the first through fourth levels which may include, for example, a control unit, a DASD, a processor and a RAID. FIG. 4E shows the first through fifth levels which includes the respective devices of each device group. In accordance with the invention, the display generator 50 may be instructed to generate a display of between one to all five of the configuration tree levels, as shown in FIGS. 4A–4E.

Figure 5:
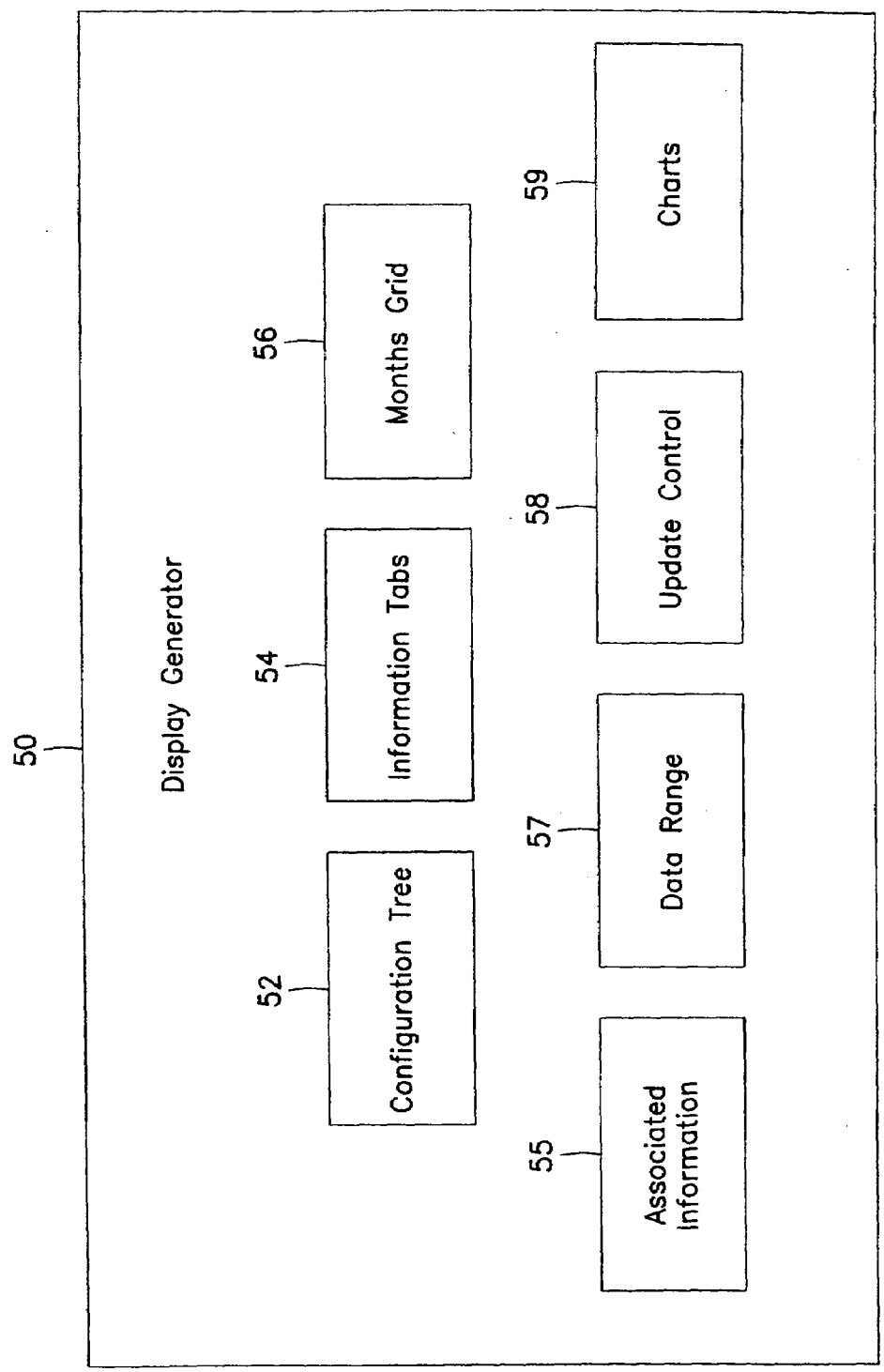
FIG. 5 is a block diagram showing the display generator of FIG. 1.
Figure 6:
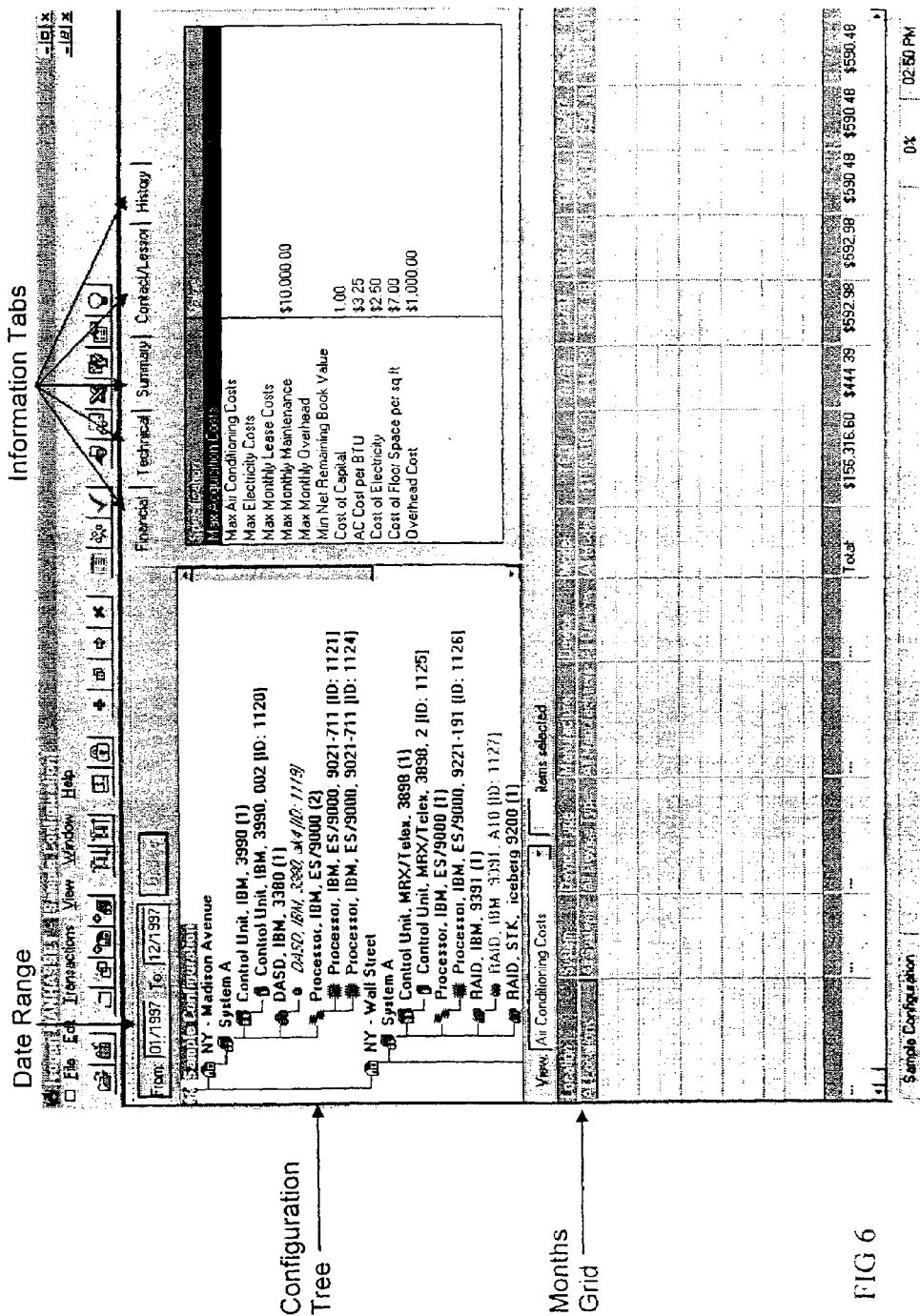
FIG. 6 shows an example of a display generated by the display generator of FIG. 5.

FIG. 5 shows a block representation of the display generator 50 in greater detail. The display generator generates a representation of part or all of a configuration tree 52, together with selected portions of its associated information 55, over a date range 57. FIG. 6 illustrates an example of a display generated by the display generator 50.

Figure 7:
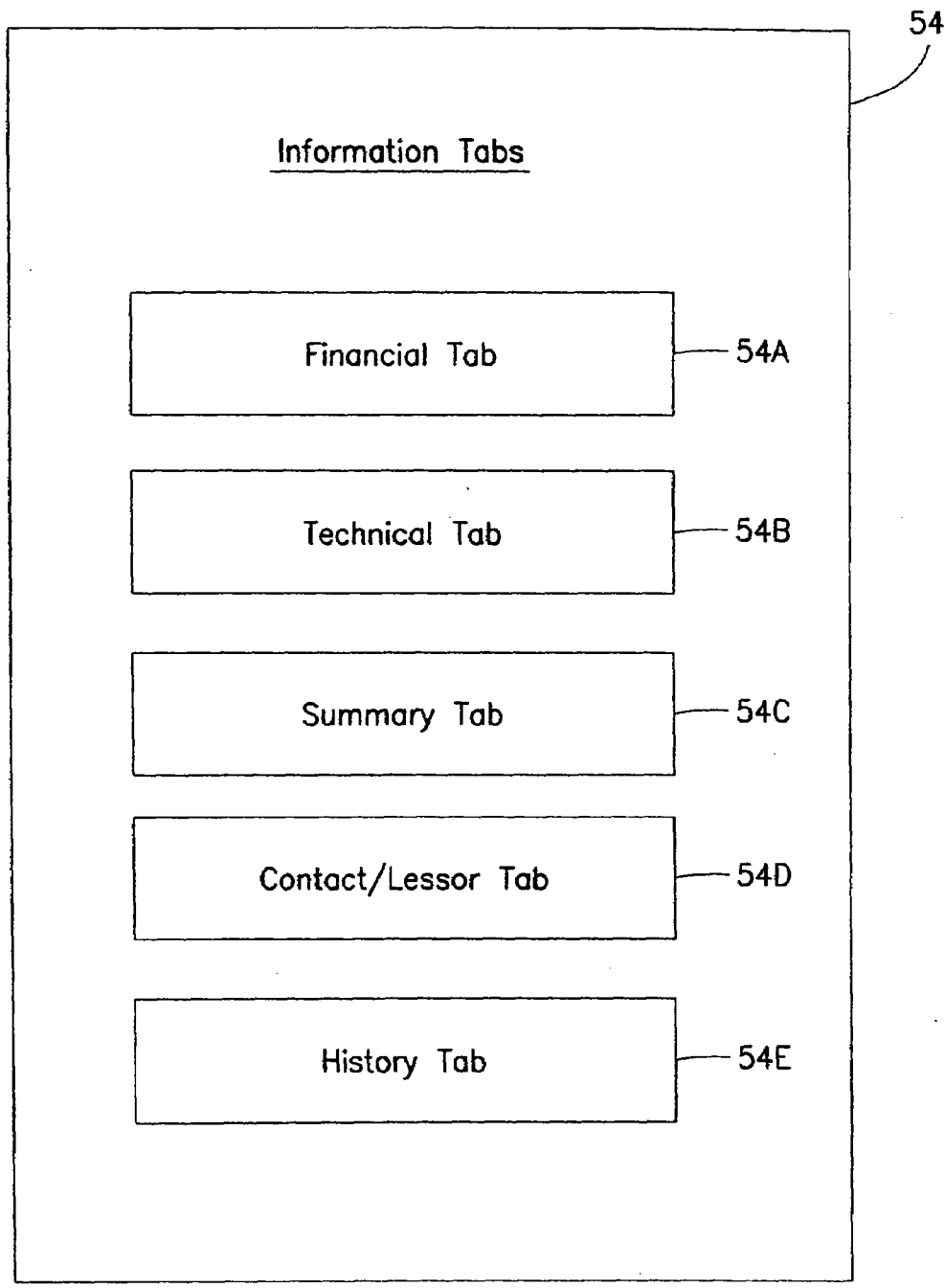
FIG. 7 is a block diagram showing the information tabs data of the display generator of FIG. 5.

The display generator 50 may also incorporate a months grid 56 which may display financial information or summaries of financial information of one or more locations, systems, device types, manufacturers, devices, and models over a selected number or months as well as the total cost of ownership (TCO) and the totals. Additionally, the display generator generates information tabs 54, shown in greater detail in FIG. 7, which include a financial tab 54A showing that financial information is being displayed, a technical tab 54B showing that technical information is being displayed, a summary tab 54B showing that summary information is being displayed, a contact/lessor tab 54D or a history tab 54E.

FIGS. 8A–8B, 9A–9B, and 10A–10C, show examples of displays generated by the display generator 50 when one of the information tabs 54 is selected for a respective element in a configuration tree.

Figure 8A:
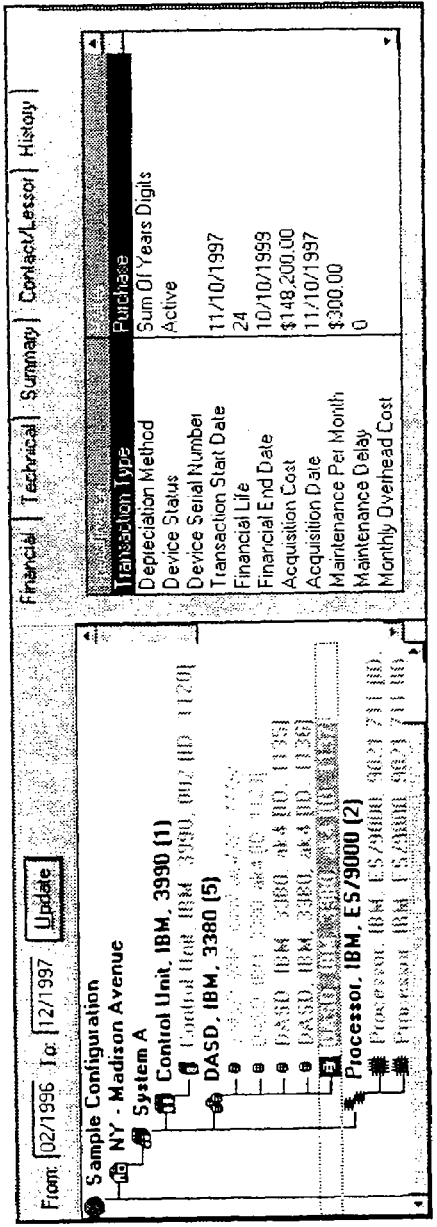
FIGS. 8A–8B shows an example of the financial specifications displayed when the financial tab of the information tabs of FIG. 7 is selected.
Figure 8B:
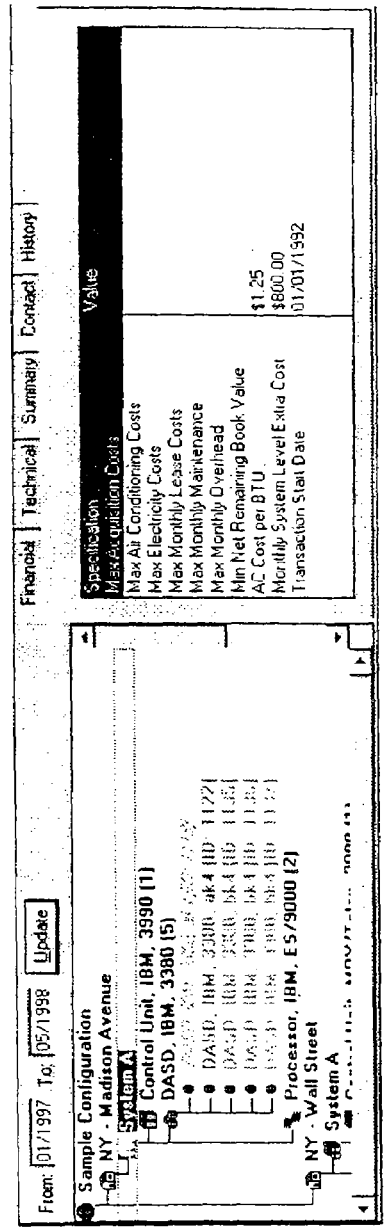

FIG. 8A shows an example where the financial tab 54A is selected for a respective device in the configuration tree. Alternatively, the financial specifications of a respective device group, system, location or of an entire configuration may be selected. As an example, FIG. 8B shows the financial specifications of a respective system.

The financial information for a respective configuration may include the cost of capital or cost of money, the air conditioning costs per BTU, the cost of electricity based on a per KVA basis, the cost of floor space per square foot, and/or the monthly overhead cost.

The financial specifications for a data center location may include its cost of capital, if different from that of the entire configuration, the air conditioning cost per BTU, if different from that of the configuration, the cost of electricity, if different from that of the configuration, the cost of floor space per square foot, if different from that of the configuration, the monthly overhead cost, and/or the total floor space.

The system level financial specifications include the air conditioning cost per BTU, if different from that of the configuration of the respective data center, and the overhead costs.

The device level financial specifications include the acquisition date, the maintenance per month, the maintenance delay, the monthly overhead costs, the financial life, the transaction start date, the acquisition cost, the salvage value, the depreciation method (if the device is purchased), the monthly lease cost and lease buyout cost (if the device is leased), the remaining book value, the device serial number, the order date, the delivery date, the installation date and the invoice date.

Figures 9A, 9B:
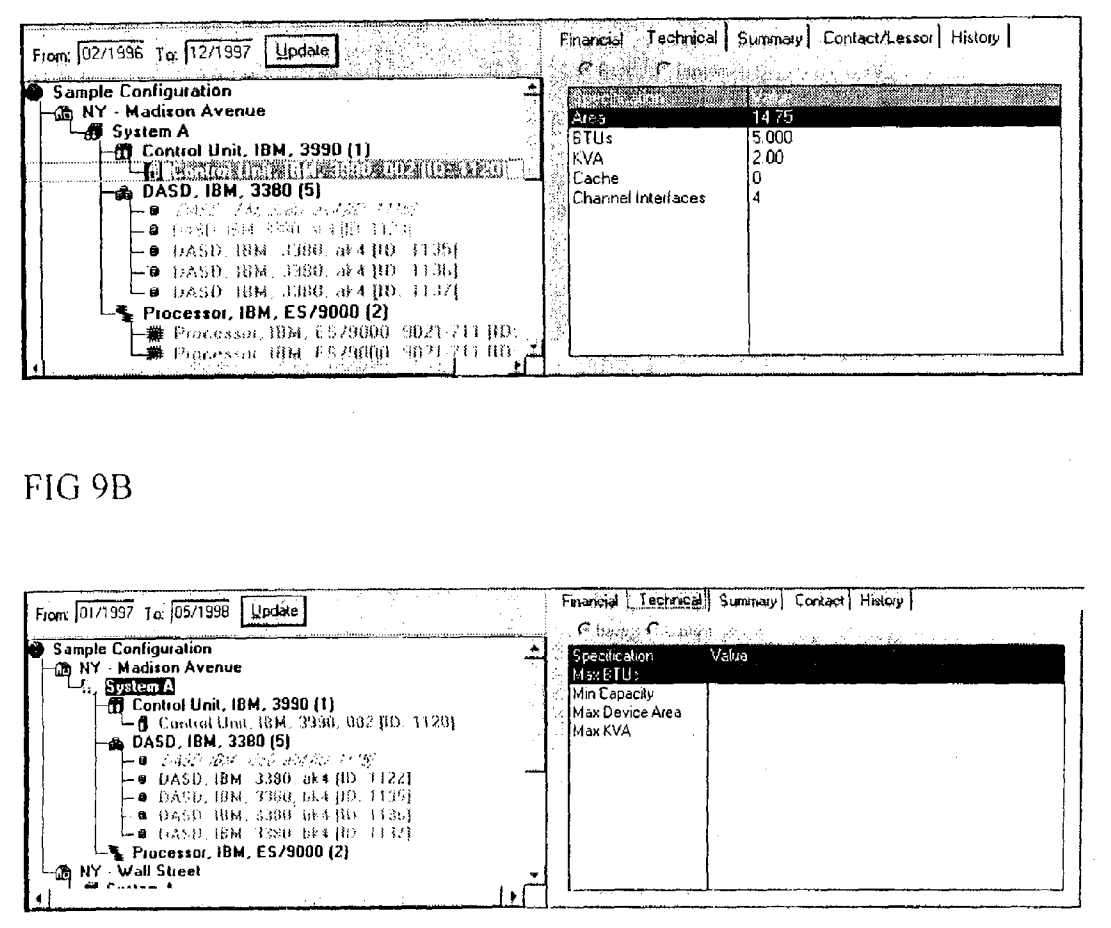

FIGS. 9A–9B show examples of displays generated by the display generator 5b when the technical tab 54B is selected. Specifically, FIG. 9A shows an example of the technical information of a respective device in the configuration tree, and FIG. 9B shows an example of the technical information of a system.

The technical information of a device may include the device type, the device manufacturer, the device model number, the device serial number, the area used, the BTUS, and the power consumed in KVA. If the device is a DASD, the technical information may also include the capacity per unit, the number of cylinders per device, the data transfer rate, the number of physical device addresses per unit, and the number of tracks per cylinder. For a RAID, the technical information may also include the capacity per unit, the logical device addresses, the cache, the number of ESCON channels, the number of logical channels, and the number of OEMI host adapters. For a control unit, the technical information may also include the cache and the number of channel interfaces.

The technical specifications of a device group, system, location or configuration may also include totals of some or all of the above information.

Figures 10A, 10B:
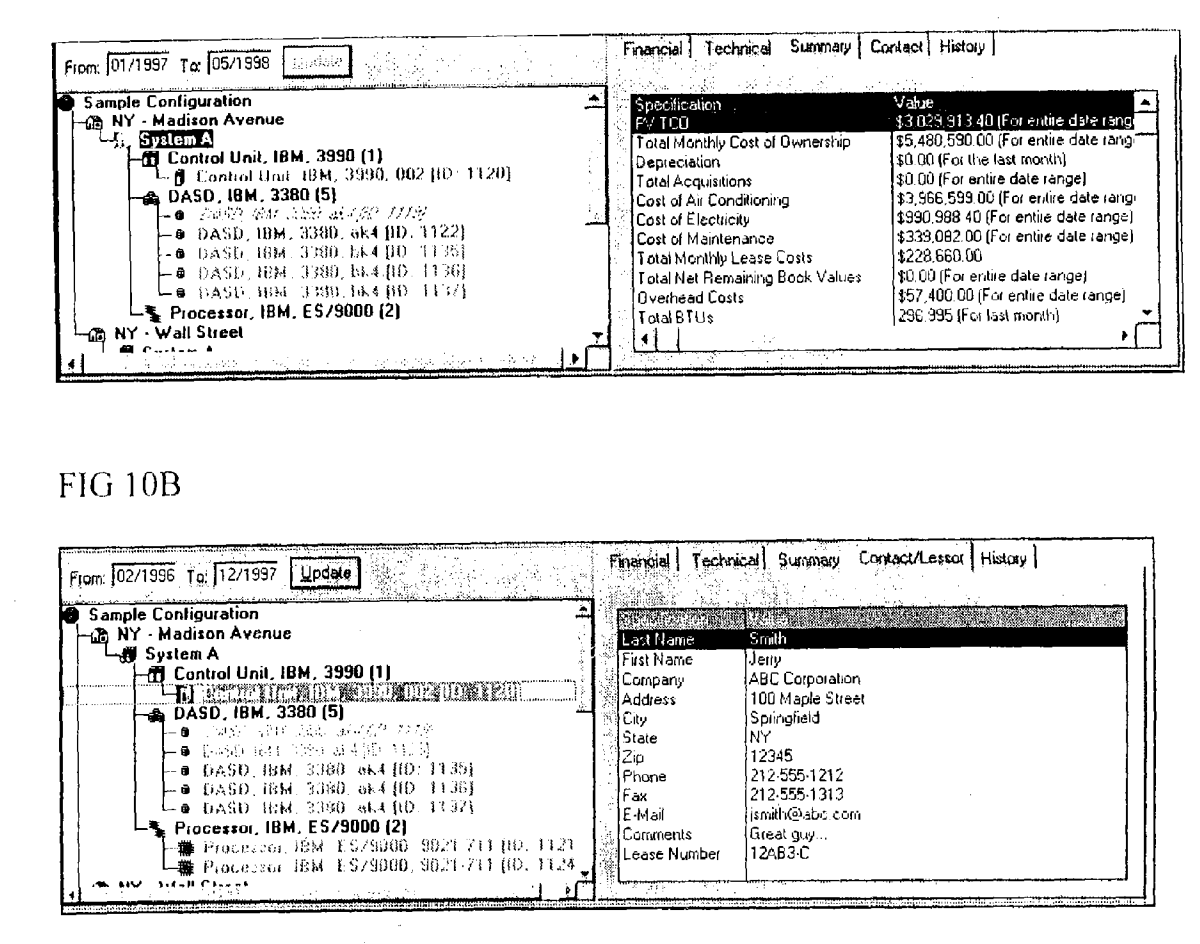

FIG. 10A shows an example of a display generated by the device generator 50 which shows a summary of the technical and financial specifications of a respective system. Alternatively, summary information of a configuration, or of one or more locations, systems or devices are shown.

FIG. 10B shows an example of a display generated by display generator 50 which shows the associated contact and lessor information of a device when the contact/lessor tab 54D is selected.

Figure 10C:
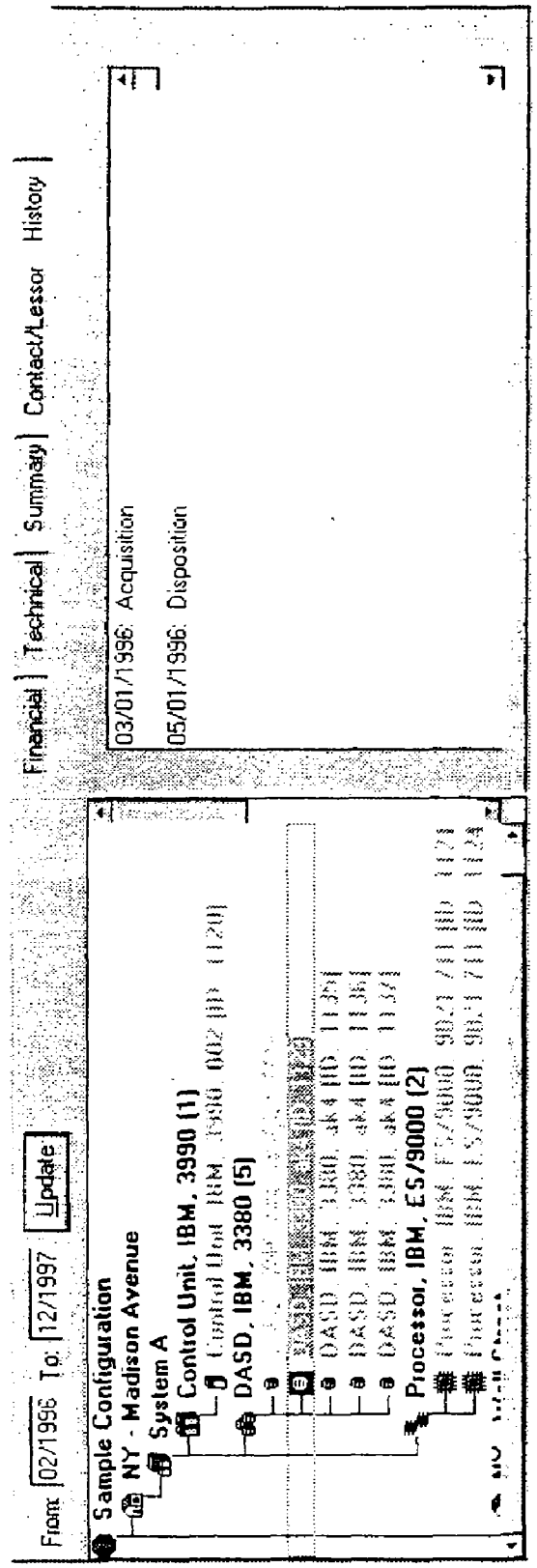
FIG. 10C shows the history data displayed when the history tab of the information tabs of FIG. 7 is selected.

FIG. 10C shows an example of a display generated by the display generator 50 when the history tab 54E is selected and shows the history of a respective device.

Referring back to FIG. 1, the table generator 60 generates a table displaying the technical information about selected levels of a configuration tree which, in turn, is formatted by the display generator 50 for display as the months grid 56.

Figure 11A:
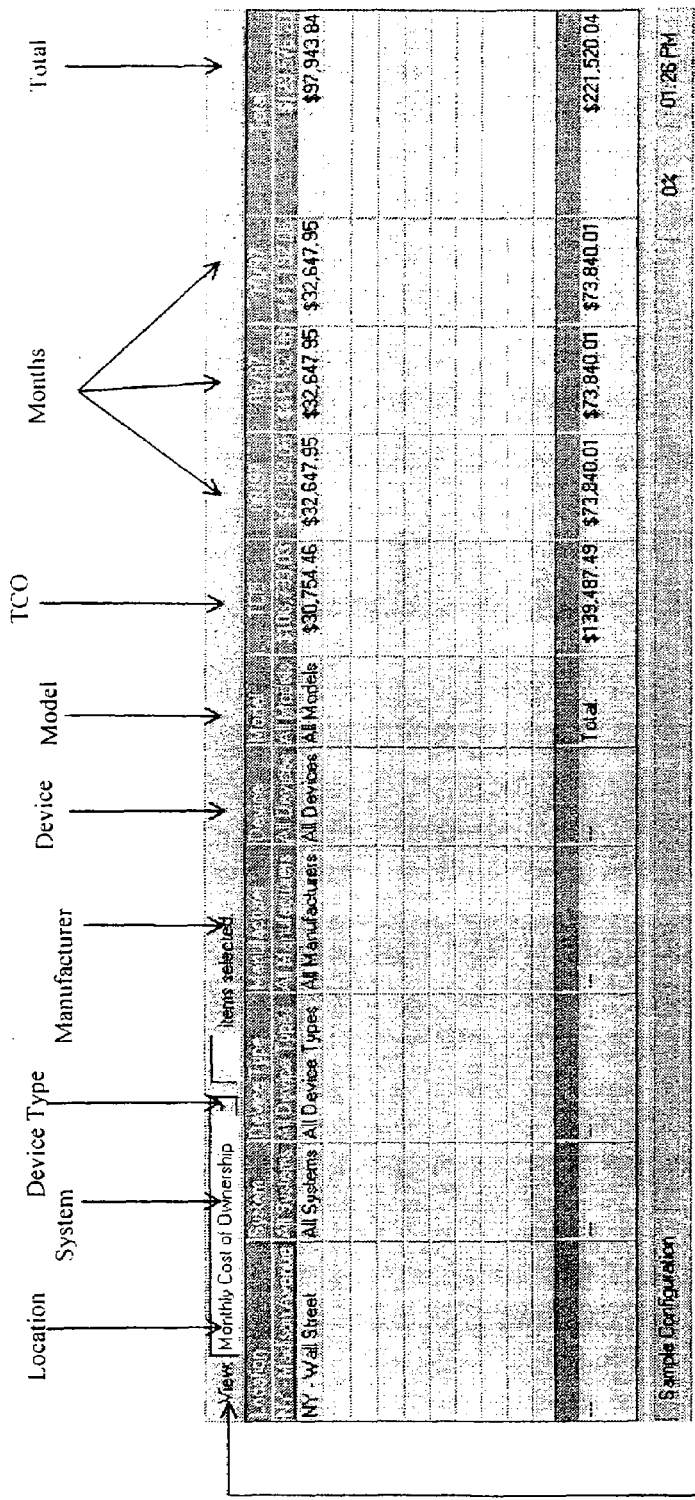
Figure 11A:
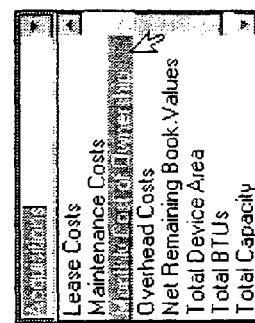

FIG. 11A shows an example of a representation of a months grid 56 which shows one or more locations, systems, device types, manufacturers, devices, models, TCOs, the monthly cost of ownership over three respective months and the total cost of ownership. Also shown are the totals for the two locations.

It should be noted that other information, such as the lease costs, maintenance costs, overhead costs, net remaining book value, total device area, total BTUs or total capacity may be shown as set out in box 56A. The months grid 56 generated by table generator 60 and display generator 50 may display specific information pertaining to a date range as a function of one or more months over any level of the configuration tree. The months grid may also be used to show comparisons between respective devices, systems or locations. As an example, FIG. 11B shows a representation of a months grid 56 that breaks out the monthly cost of ownership by device.

The respective locations, systems, device types, and devices that are selected for comparison in the months grid are selected from the configuration tree generated for display by the display generator 50, such as is shown in FIG. 6, and the criteria used for comparison may be selected from the criteria shown in box 56A of FIG. 11A.

Figure 12:
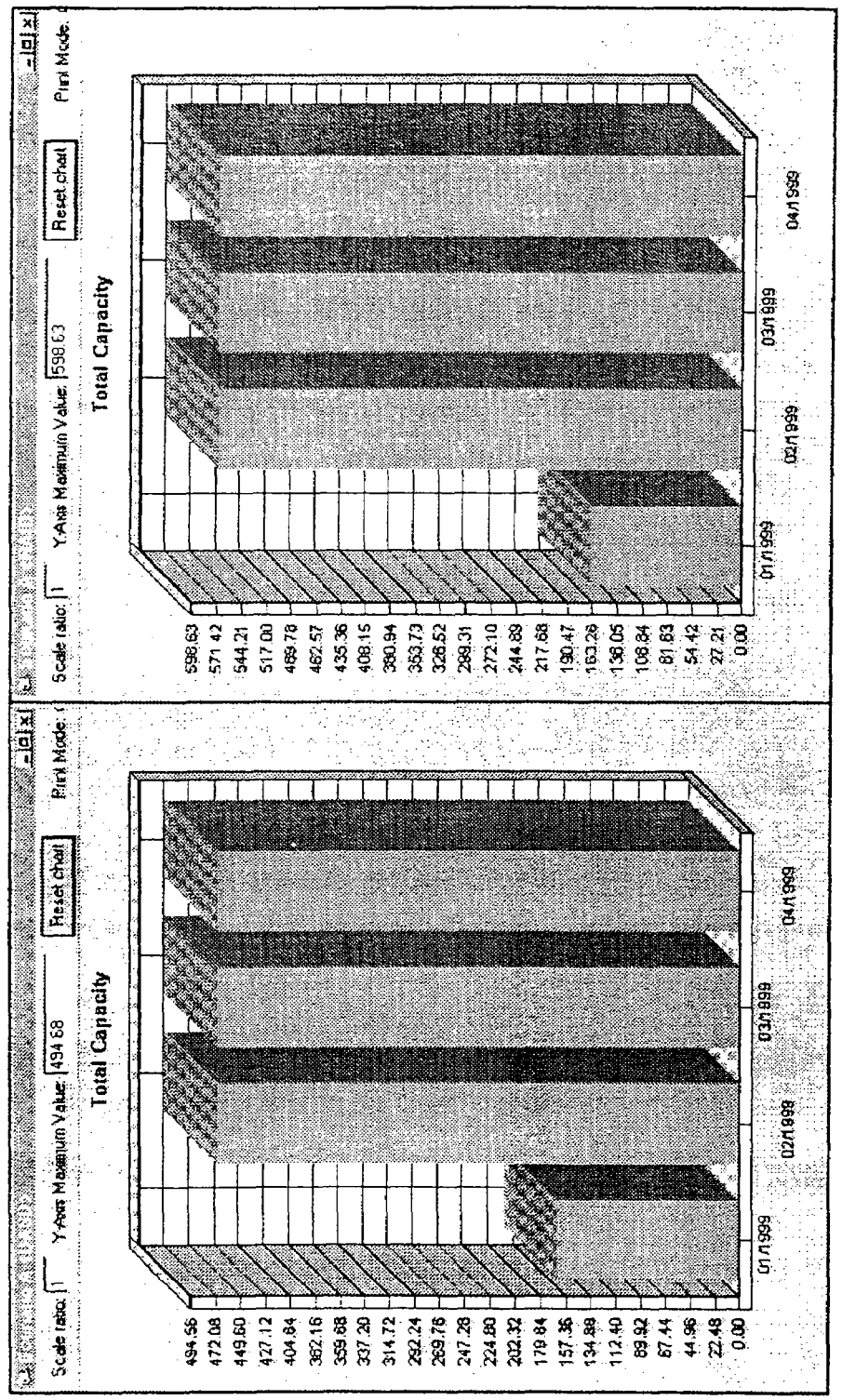
FIG. 12 shows an example of a chart generated by the chart generator of FIG. 1.

A graphic representation of the information continued in months grid 56 may be generated by the chart generator 80 and formatted by the display generator 50. FIG. 12 shows an example of a bar chart generated by the chart generator 80 and the display generator 50. Alternatively, stack charts, pie charts or other types of charts may be generated. It should be noted that charts representing information concerning one or more devices, device types, systems, locations or configurations may be displayed concurrently.

Figure 24A:
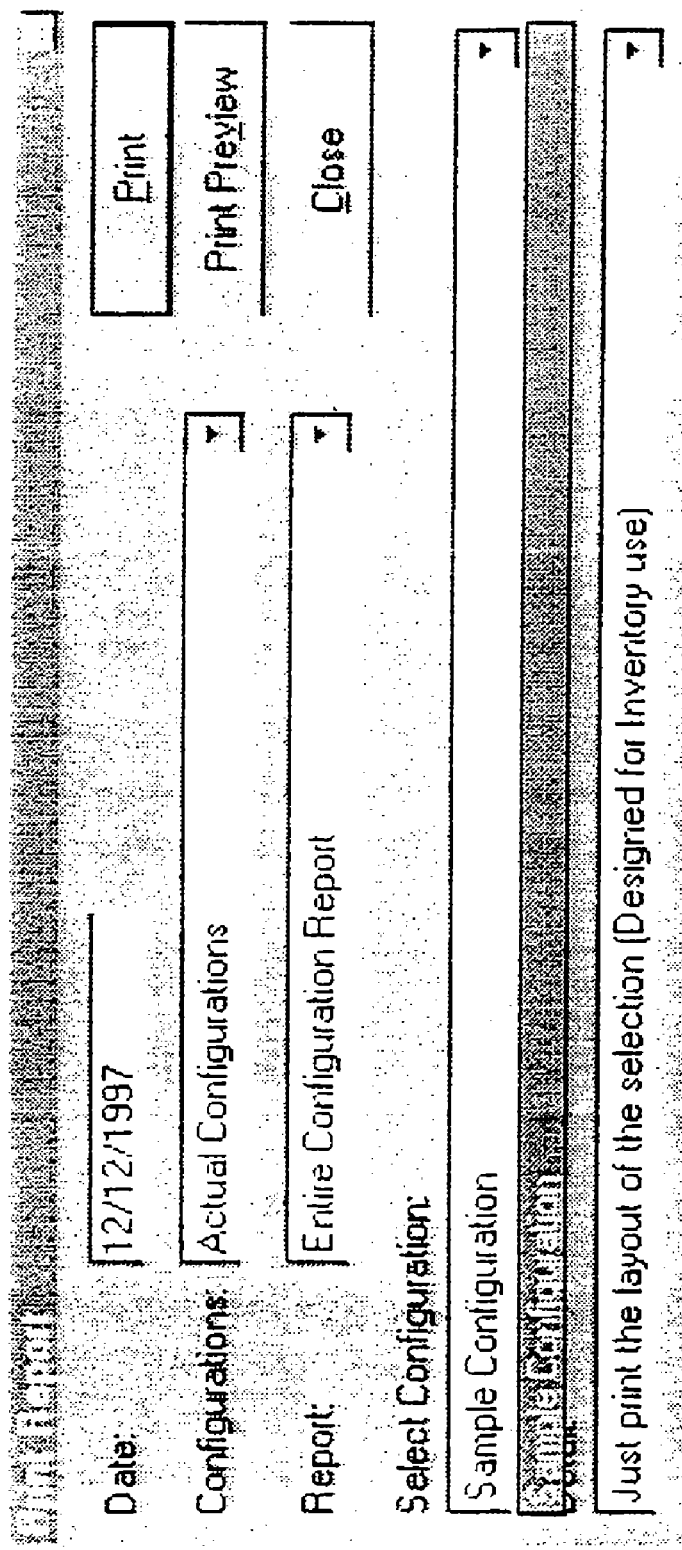
FIGS. 24A, and 24B and 24C show examples of a displayed representation of the operation of FIG. 24A and a computer screen thereof.
Figure 24B:
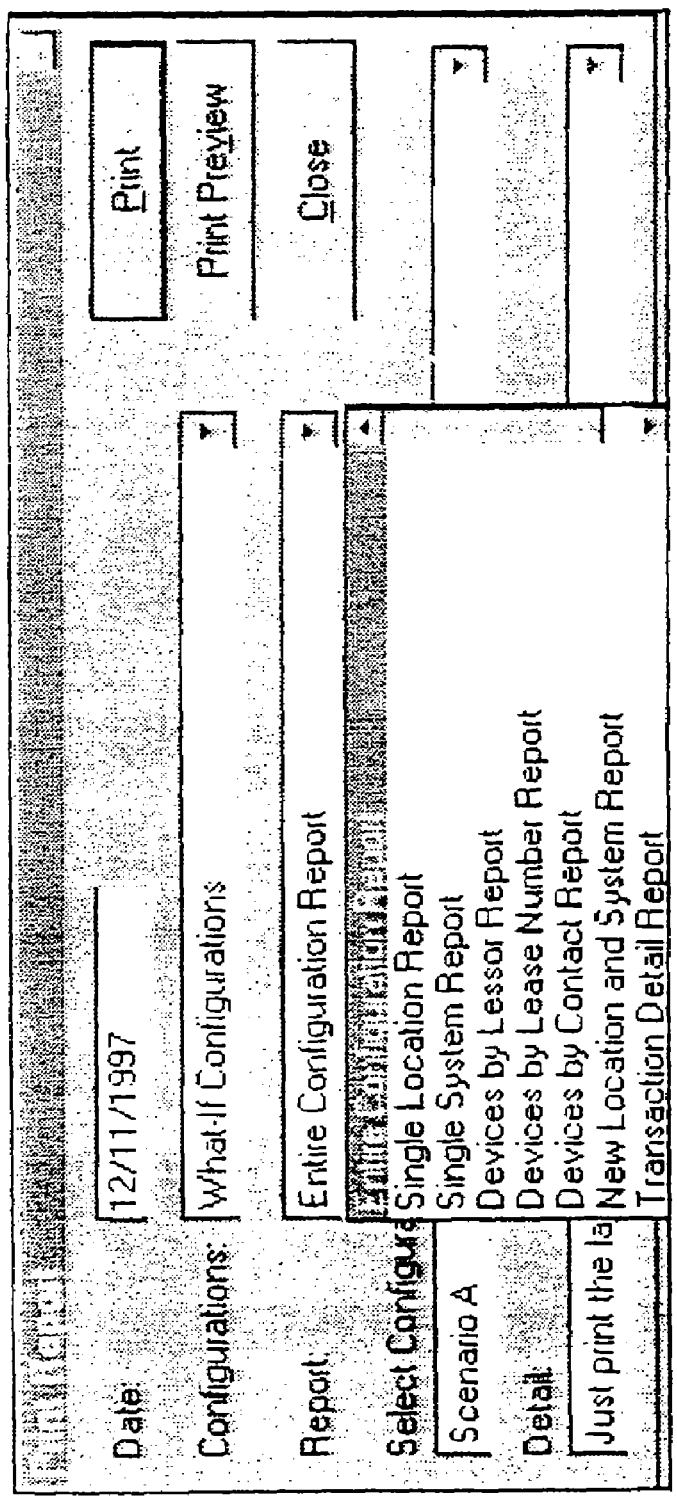

The report generator 70 shown in FIG. 1 generates reports of selected degrees of detail which may be either printed out or formatted for display by the display generator 50. FIGS. 24A and 24B illustrate an example of a print report request. Each requested report begins from a first date in which the devices were acquired up to a specified date for an actual or a proposed configuration. The type of report is also selected and may cover an entire configuration, a single location, a single system, the devices by lessor, the devices by lease number, the devices by contract, new location and system, transaction detail, or a shopping list. The name of the configuration and/or location is also selected as well as the degree of detail.

A report of an entire configuration provides information about the configuration and includes all locations, systems and devices in the configuration. A report of a single location provides information about the configuration and the location and includes all systems and devices within the location. A single system report provides information about the configuration, location and the system and includes all devices in the system. A "devices by lessor" report provides information about all leased devices by a specified lessor and shows information about all locations and systems where such devices are installed. A "devices by lease number" report provides information about all leased devices belonging to a selected lease number and shows information about all locations and systems where such devices are installed. A "devices by contract" report provides information about all purchased devices based on a selected contact and shows information about all systems and locations where such devices are installed. Other reports are also possible.

A new location and system report provides information about new locations and systems that have been added to a proposed ("What-If") configuration. A transaction detail report provides a chronological list of all transactions created while preparing a proposed configuration. A shopping list report provides a list of all transactions within the What-If configuration that are different from the actual configuration. Advantageously, this report specifies the devices that must be added, disposed, renegotiated or moved to change an actual configuration to a What-If configuration.

The editor 55, shown in FIG. 1, stores, retrieves and edits contact information, changes the requirements and specifications of any item within a configuration, and deletes a transaction with the configuration storage 40. The editor also enables custom modification to the knowledge base 30.

Custom modifications to the knowledge base include adding a manufacturer, adding a device, adding a model, modifying and adding information about a device, creating an additional set of customer specifications for a respective device, changing the set of specifications that is defined as the default set, adding information about RAID devices, and adding or removing a custom specification of a RAID device. Throughout the instant specification, "device" or "element" refers to either hardware components, assemblies, products, etc. and/or to software products.

The knowledge base 30 is also periodically updated by information provided by a disk, online or in a CD-ROM.

In addition to storing and displaying information concerning an existing configuration, the invention enables the simulation and optimization of changes to existing configurations. Editor 55 and the display generated by the display generator 50 are used to create a new location or system, add device levels and devices, update financial and technical information, move devices, and dispose of devices as specified by a user. The editor 55 and the display generated by the display generator 50 also allow for the creation of proposed or "What-If" configurations.

Figure 13A:
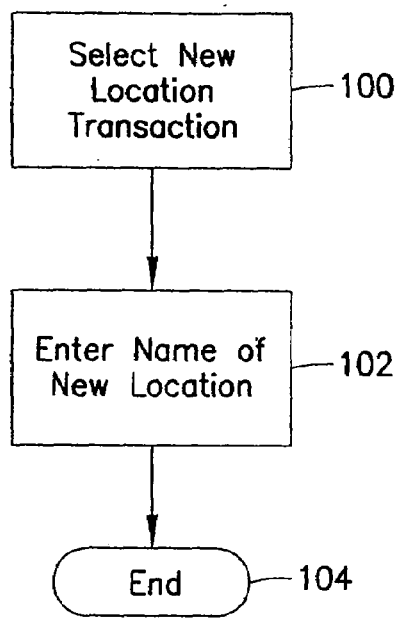
FIG. 13A is a flow chart illustrating the flow of a Select New Location transaction.
Figure 13B:
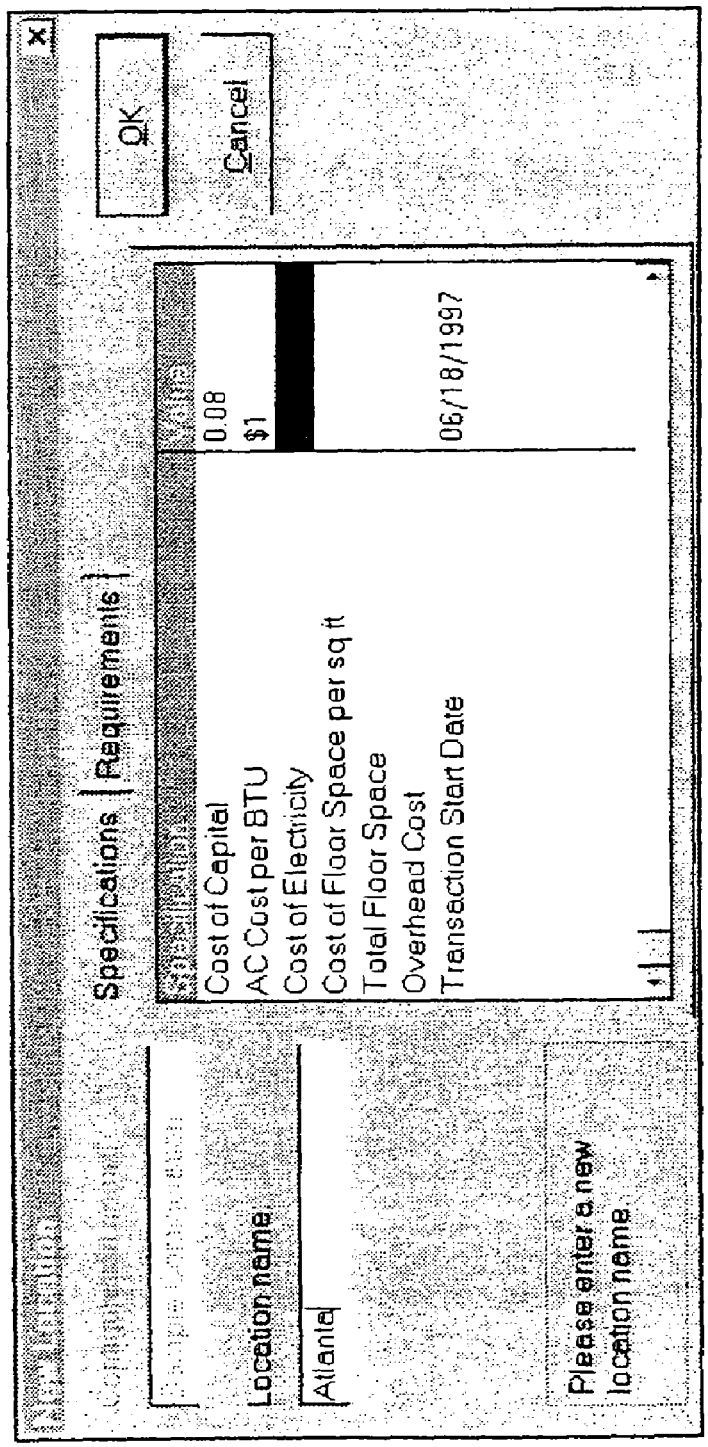
FIG. 13B illustrates an example of a displayed representation of a Select New Location transaction.

FIG. 13A shows a flow chart of a transaction for creating a new location within a configuration. First, a Select New Location transaction is selected at step 100, such as by selecting a menu item on the display generated by the display generator 50 and as shown in FIG. 6, for example. Then, the name of the new location is entered at step 102. FIG. 13B shows an example of a display of a new location with its specifications.

Figure 14A:
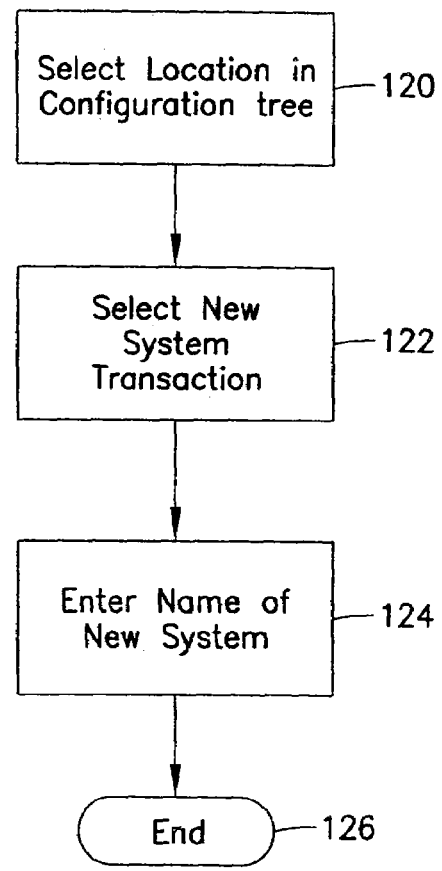
FIG. 14A is a flow chart illustrating the flow of a Select New System transaction.
Figure 14B:
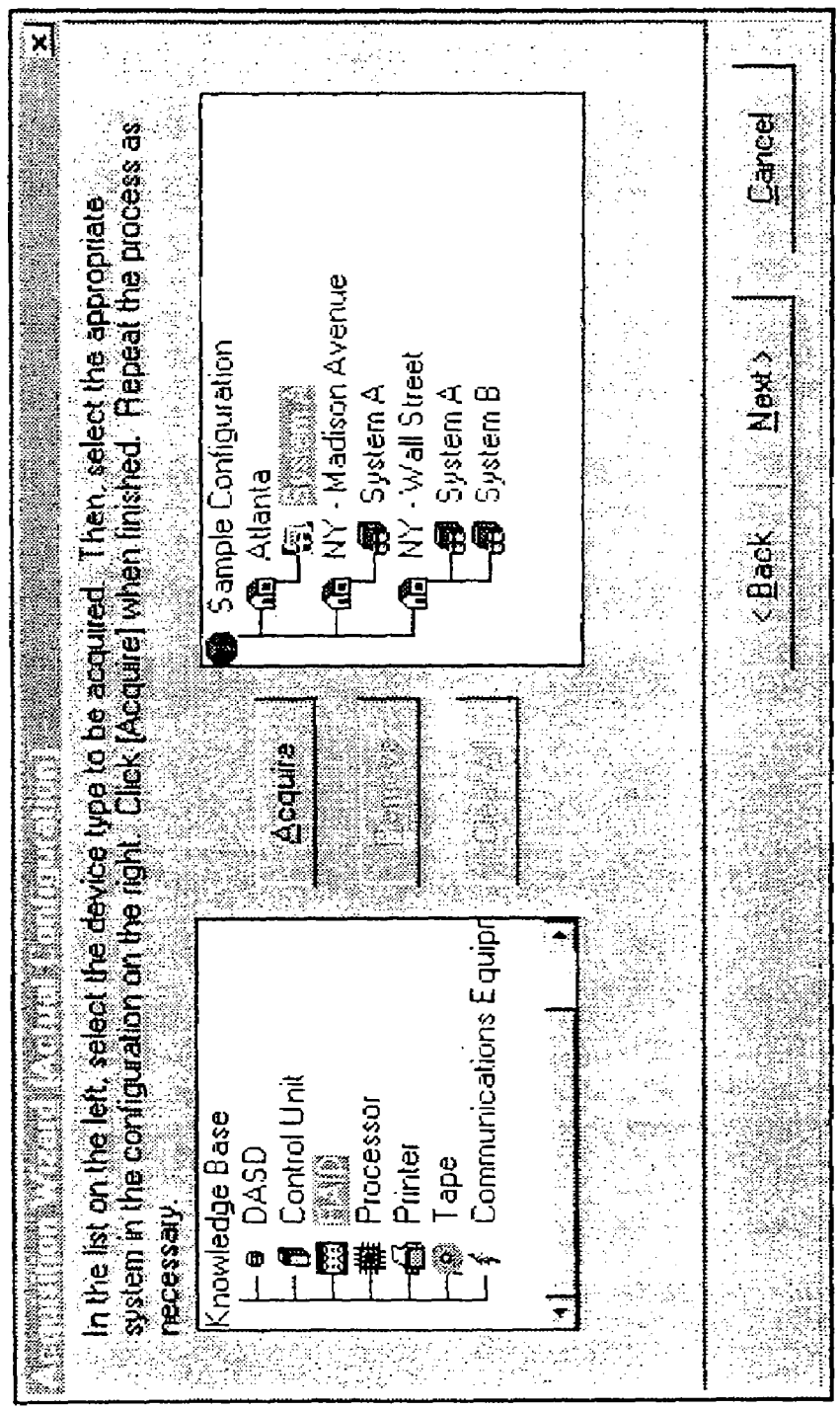
FIG. 14B illustrates an example of a display of a Select New System transaction.

FIG. 14A shows a flow chart which describes the flow of a transaction for adding one or more systems to a respective location. First, a respective location is selected from the configuration tree at step 120, and a New Systems transaction is selected at step 122. The name of the new system is then entered at step 124. FIG. 14B shows an example of a display showing the acquisition of a device. Here, a processor has been selected from the knowledge base and has been added to System B at the NY-Wall Street location in the configuration.

Figure 15A:
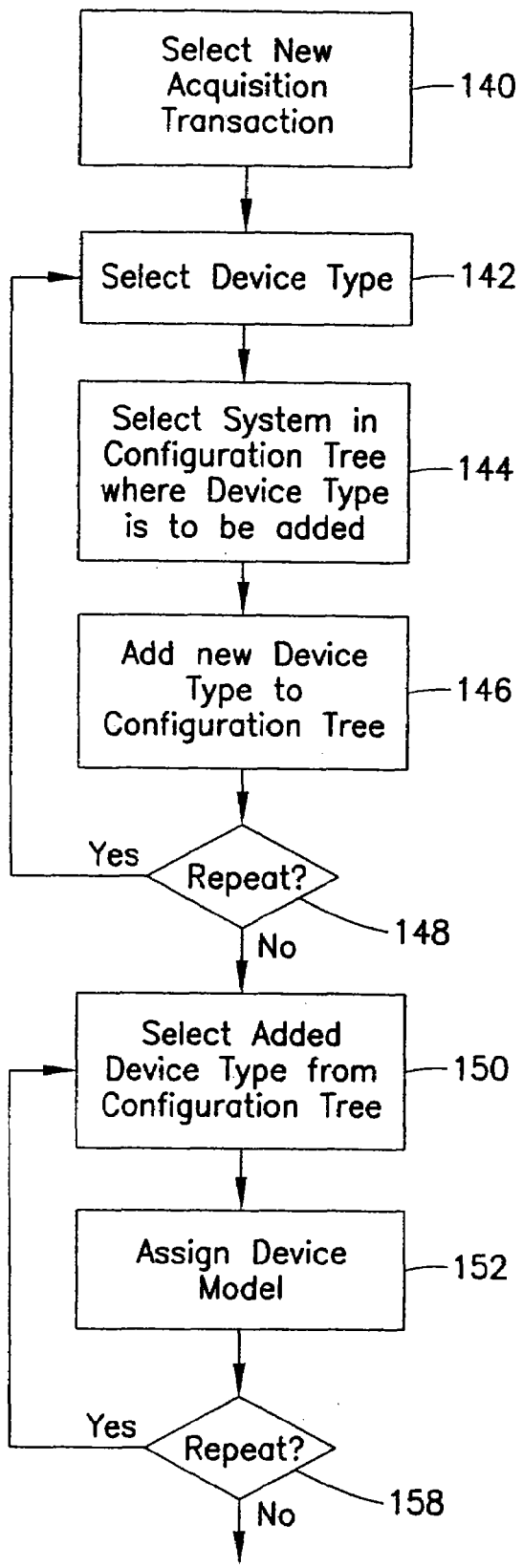
FIGS. 15A–15B are flow charts illustrating the flow of a Select New Acquisition transaction.
Figure 15B:
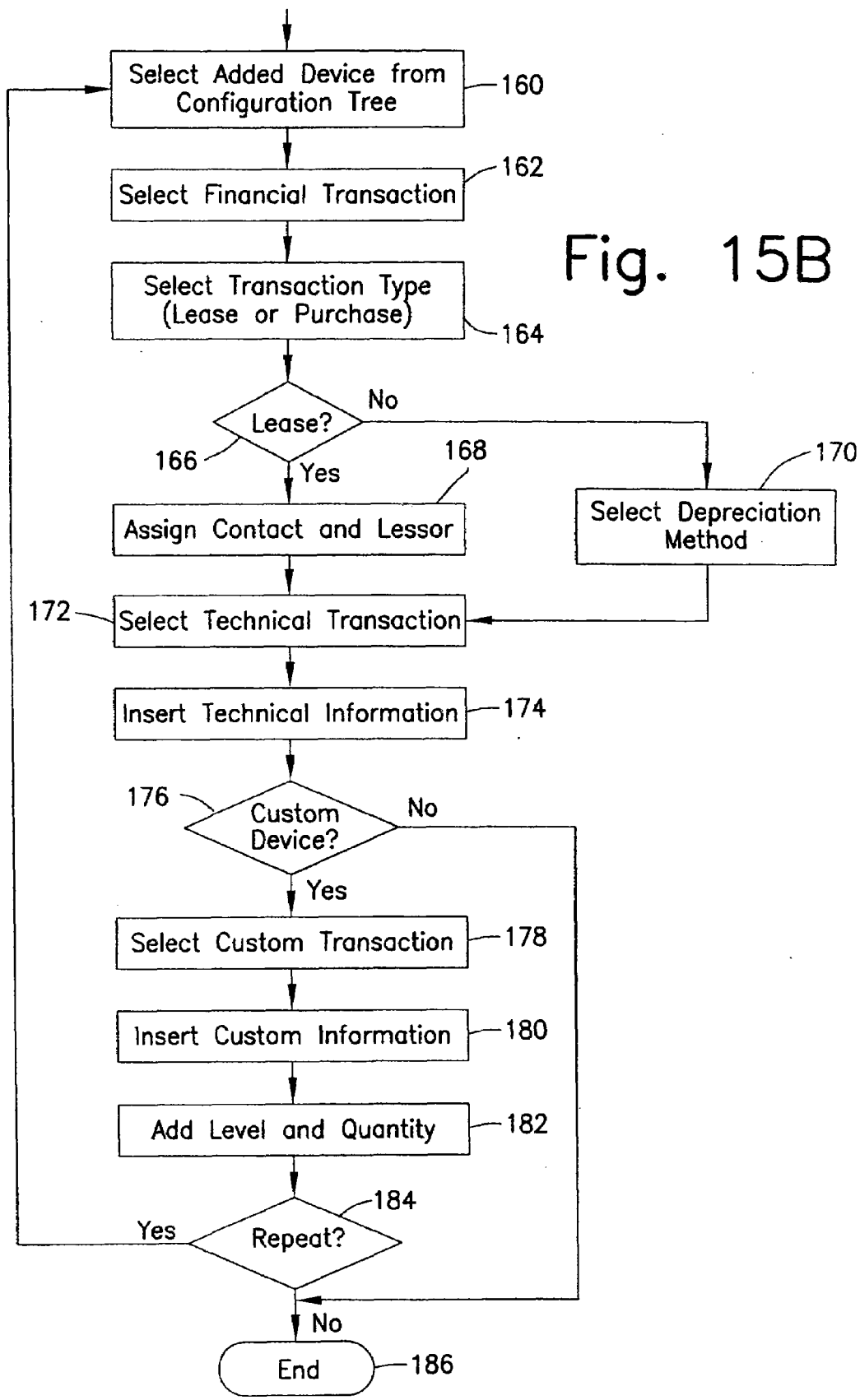
Figure 16A:
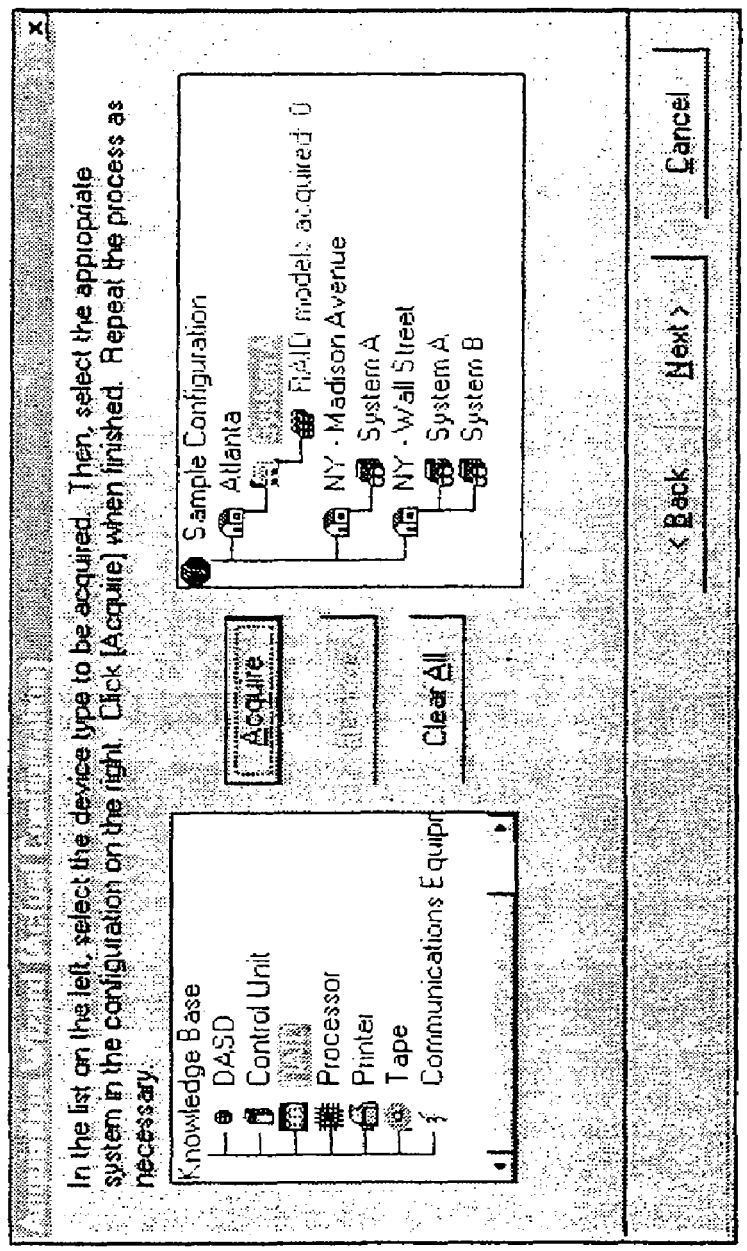
FIGS. 16A–16G show examples of displayed representations of several of the steps of FIGS. 15A–15B.

FIGS. 15A–15B are flow charts showing the transactions for adding a device and its associated information. At step 140 of FIG. 15A, a New Acquisition transaction is selected. Then, at step 142, a device type is selected from the knowledge base and at step 144, a system is selected in the configuration tree where the device type is to be added. The new device type is added to the configuration tree at step 146. If desired, steps 142, 144 and 146 may be repeated for adding other device types at step 148. FIG. 16A shows an example where a processor was selected from the knowledge base and added to a configuration.

Figure 16B:
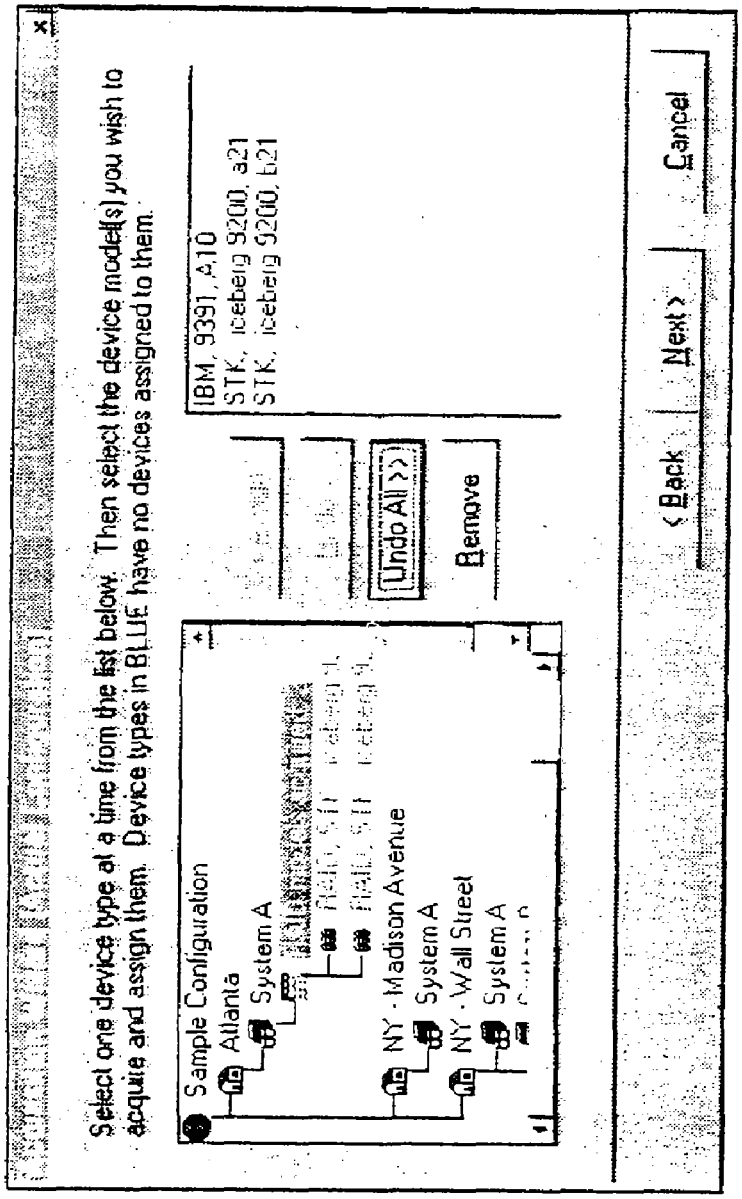

Thereafter, one of the newly added device types is selected from the configuration tree at step 150, and a device model is assigned to the newly added device at step 152. As step 158 shows, steps 150 and 152 are repeated for each newly added device. FIG. 16B shows an example with two newly added device types.

Figure 16C:
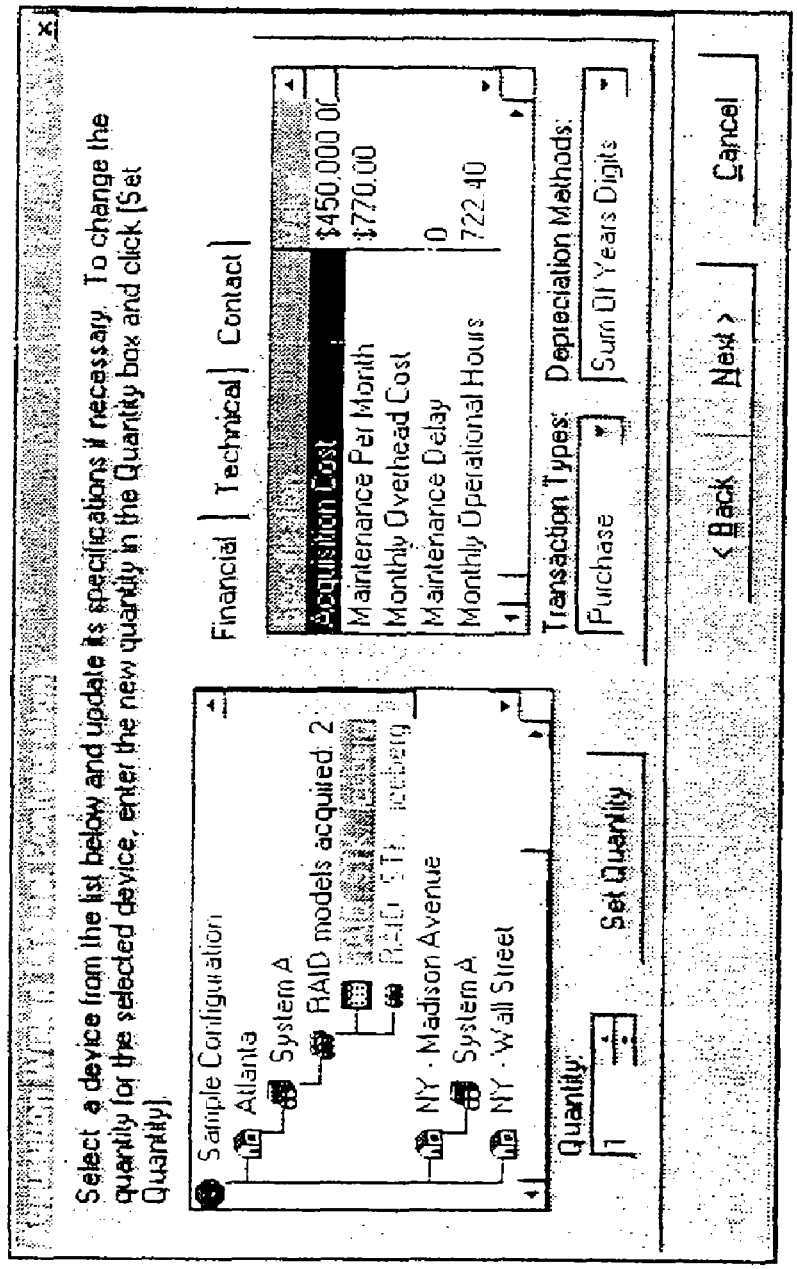
Figure 16D:
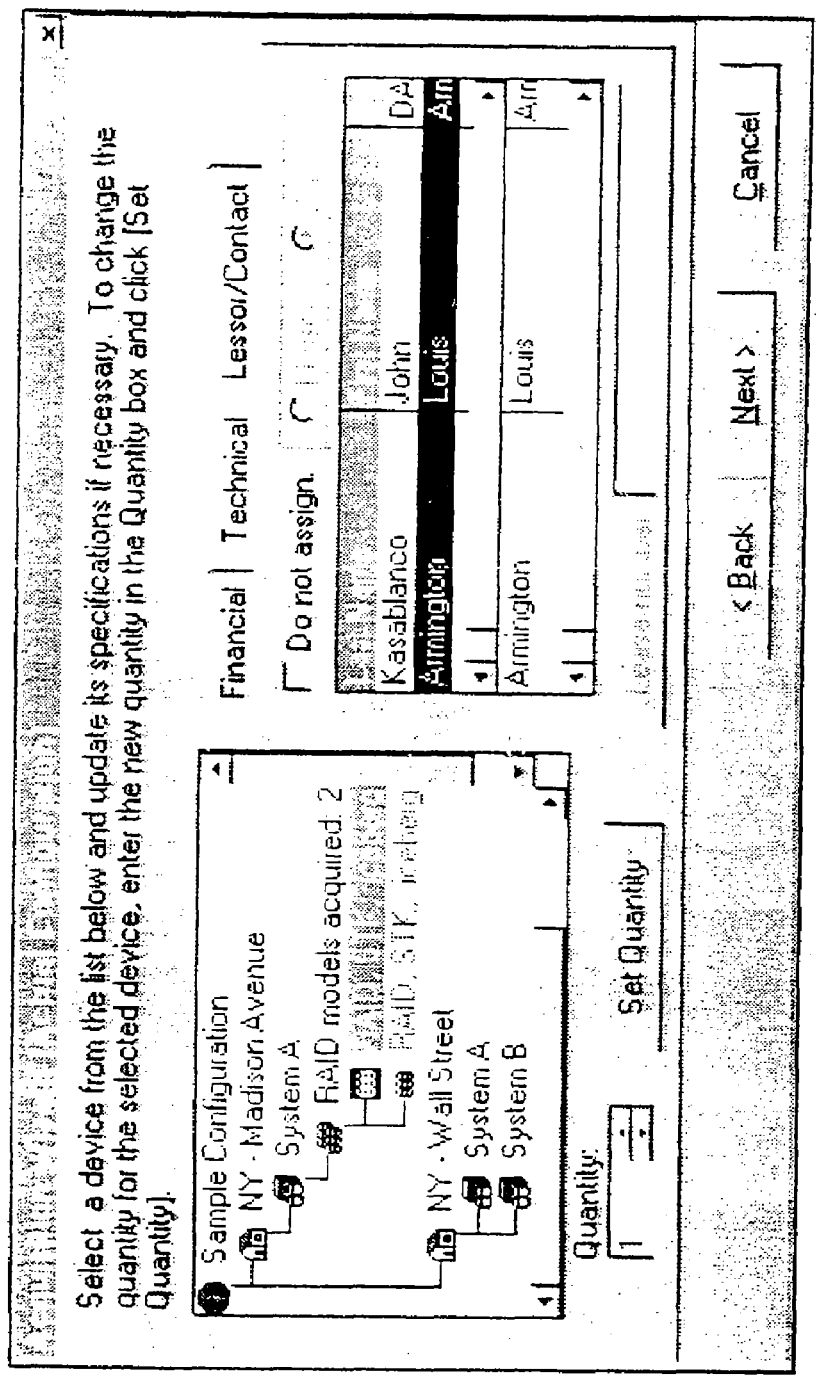

The associated information for each newly added device is then entered. At step 160 of FIG. 15B, one of the newly added devices is selected from the configuration tree. Then, at step 162, the financial tab is selected so that financial information is included. A transaction type, namely either the lease or purchase of a new device, is selected at step 164. If the device is leased, as step 166 shows, a contact and lessor are entered at step 168. Alternatively, if the device is purchased, a depreciation method is selected at step 170. FIG. 16C shows an example where financial information has been entered for a newly acquired RAID device. FIG. 16D shows an example where the names of contacts have been entered for the newly acquired device.

Figure 16E:
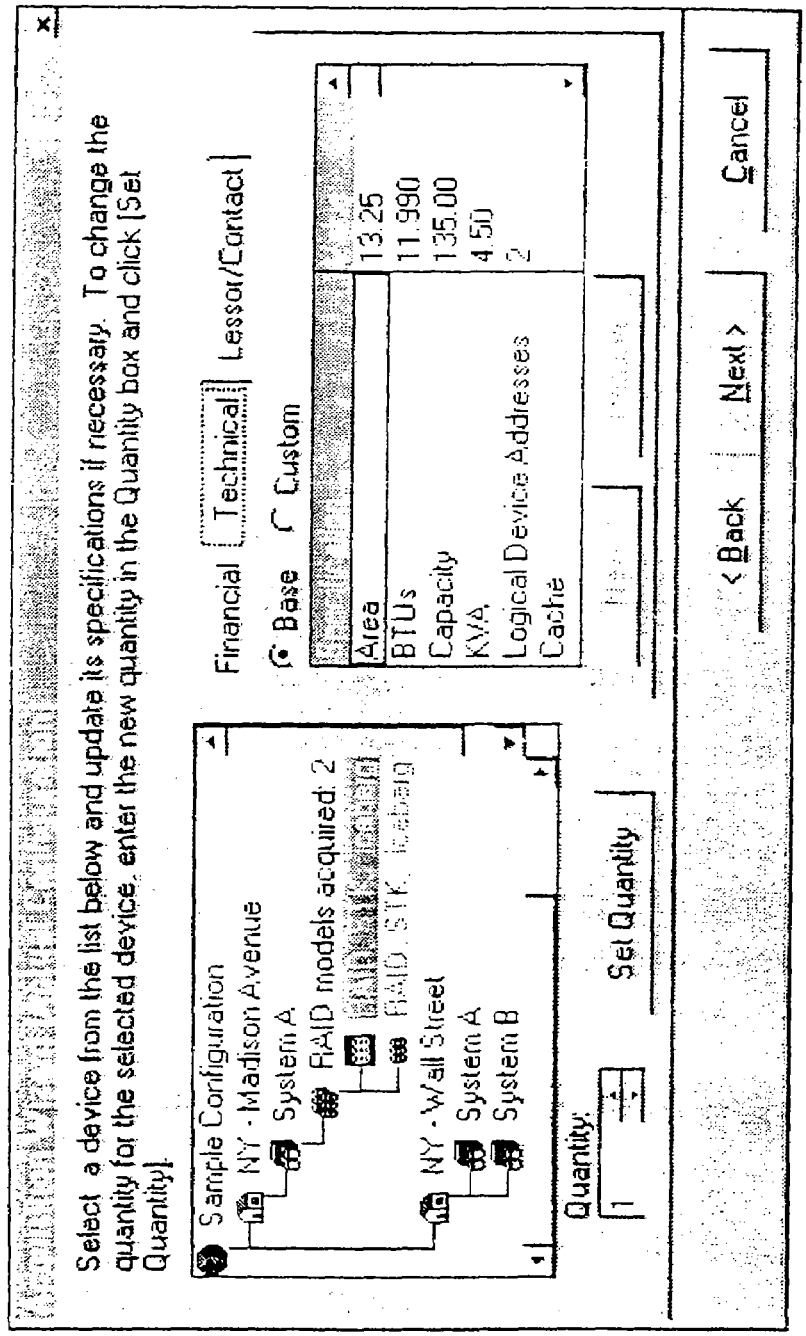

The technical tab is selected at step 172 so that technical information for the newly added device may be entered at step 174. FIG. 16E shows an example where the technical information is added for a newly acquired RAID device. It should be noted that the technical information may alternatively be added before the financial information.

Figure 16F:
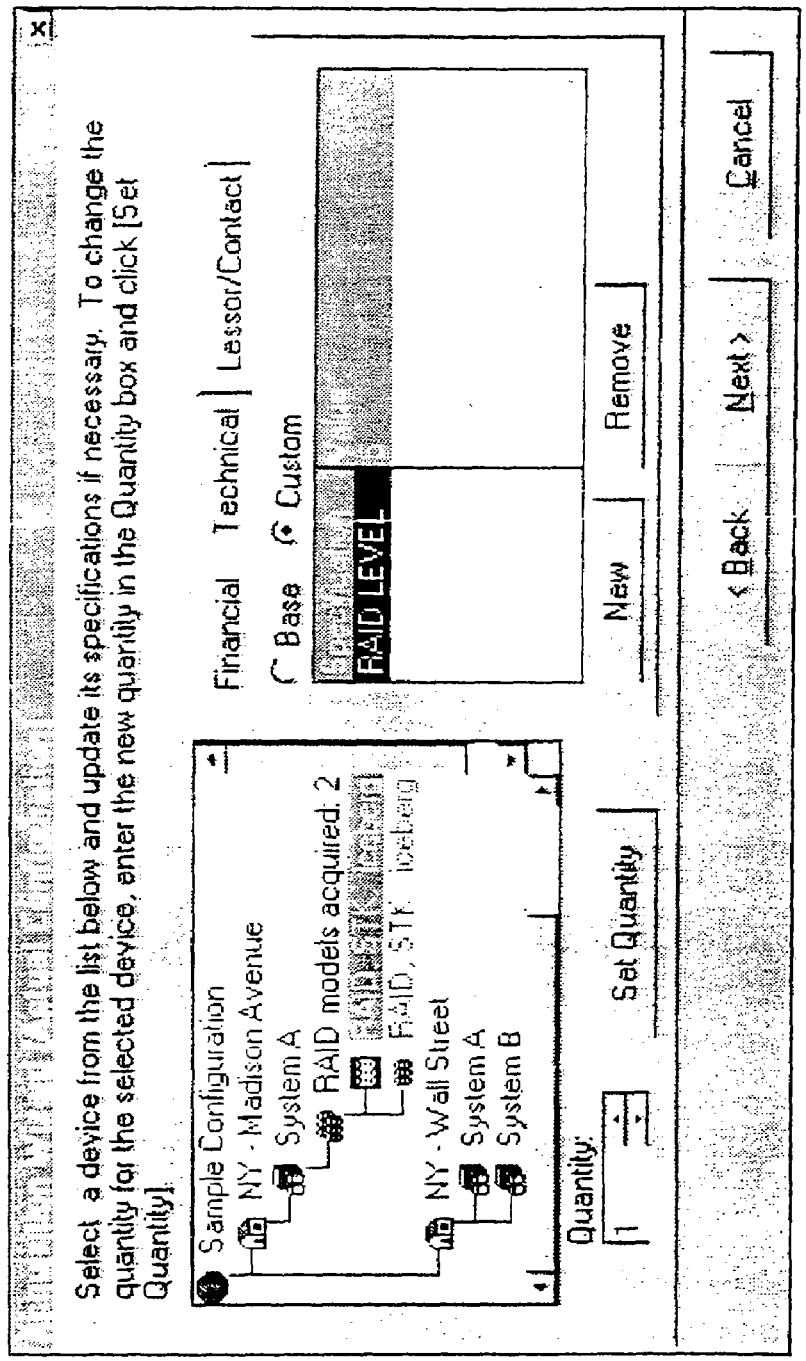
Figure 16G:
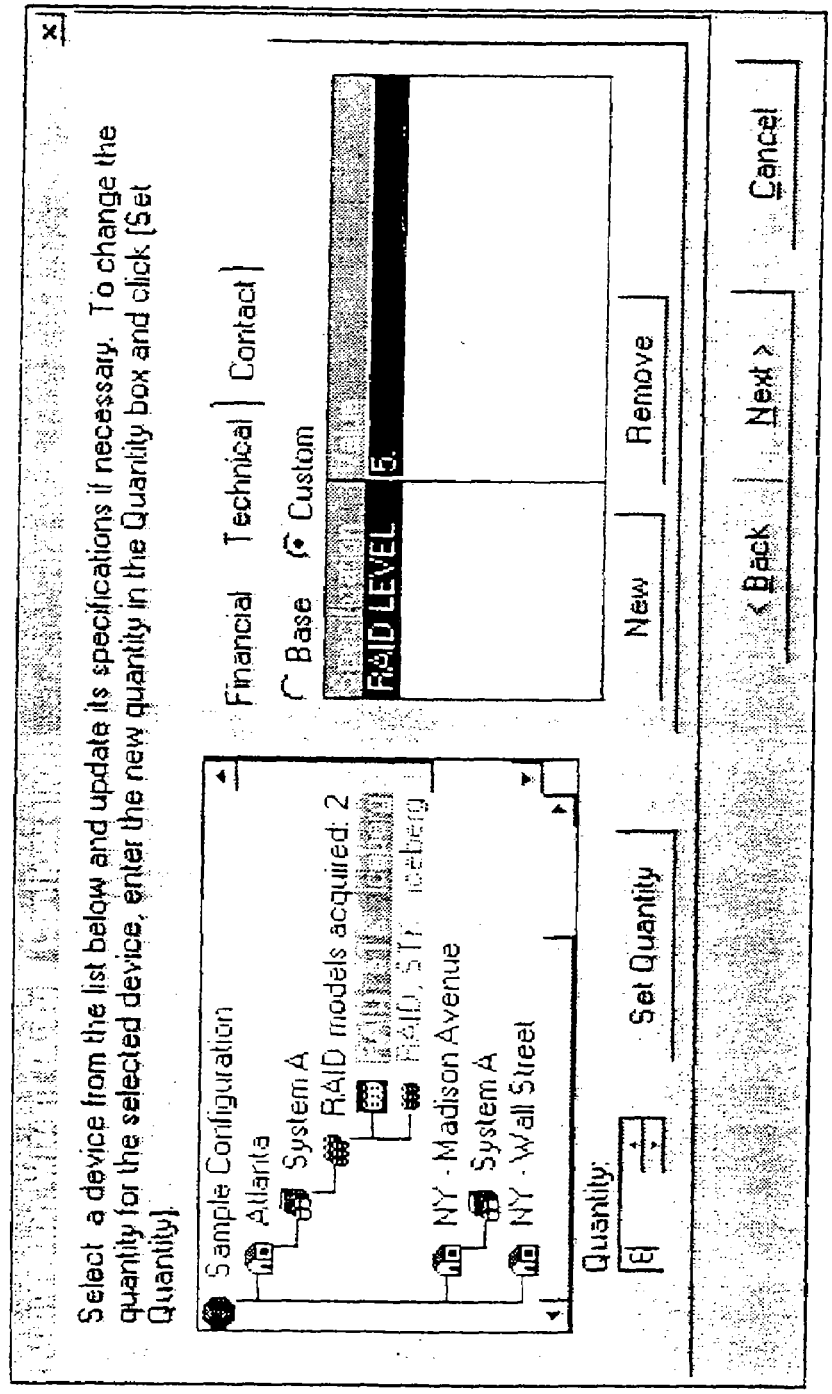

Then, if the newly added device includes custom in-house or manufacturer provided modifications, as shown at step 176, the custom option is selected at step 178. Custom information is then added at step 180. For example, for a RAID device, the RAID level field and its corresponding quantity are added at step 182. FIGS. 16F and 16G show examples of such transactions.

Steps 160 to 182 may then be repeated for each newly added device at step 184.

Figure 17:
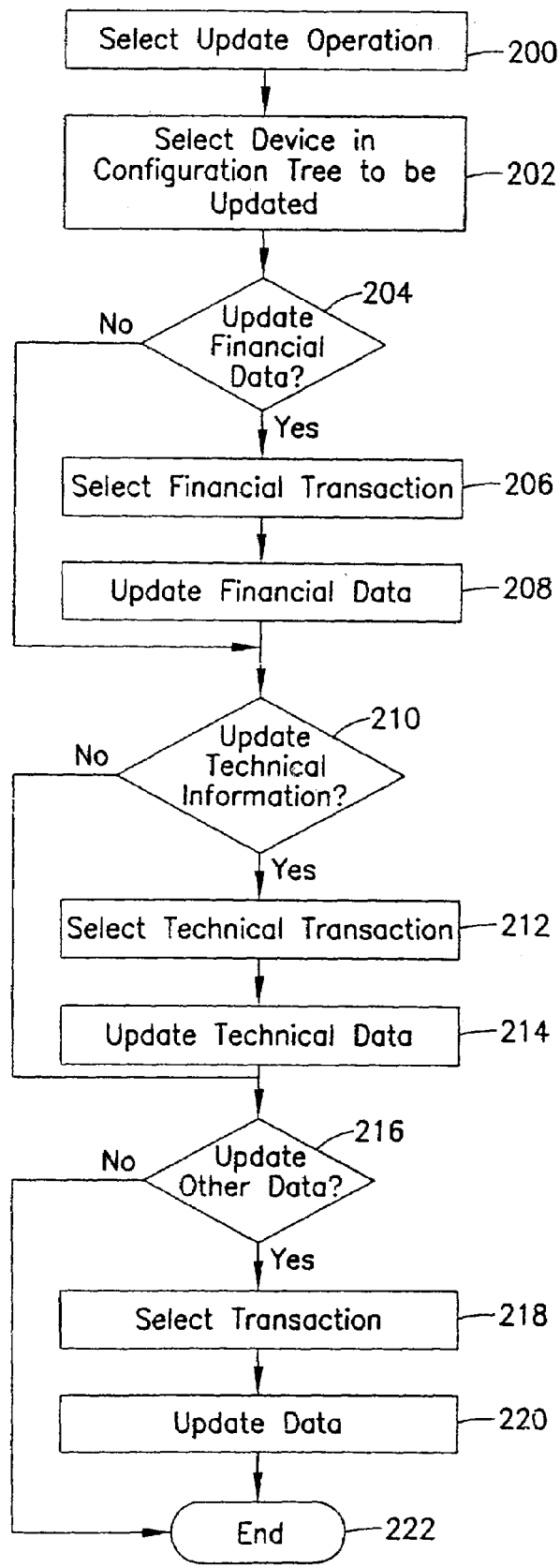
FIG. 17 is a flow chart illustrating the flow of an Update operation.
Figure 18A:
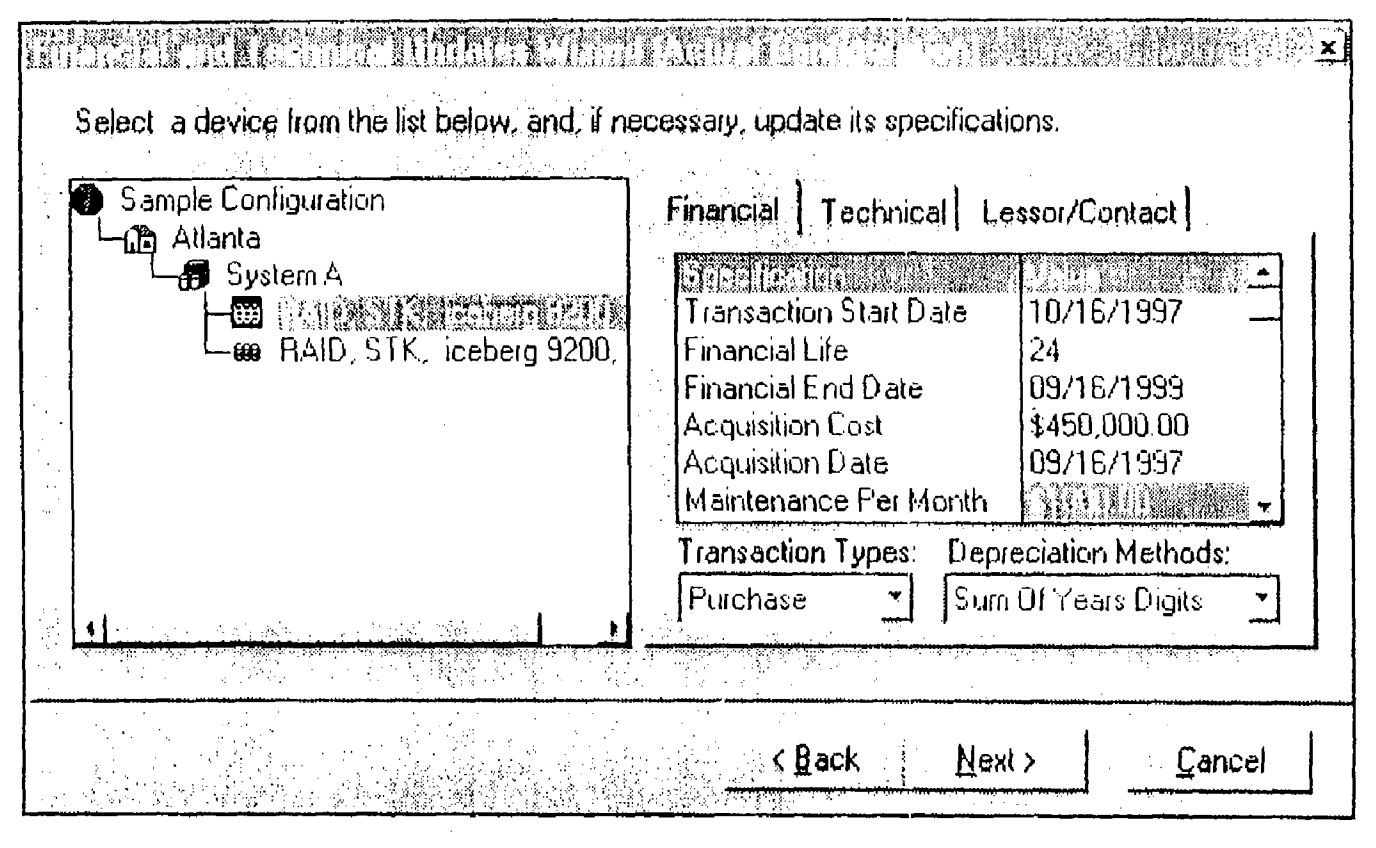

FIG. 17 is a flow chart illustrating the steps for updating financial and technical information. First, the Update Operation is selected at step 200, and the device in the configuration tree for which the technical and/or financial information is to be updated is selected at step 202. If the financial data is to be updated, as shown at step 204, the financial tab is selected at step 206, and updated financial data is then entered at step 208. FIG. 18A shows an example where the maintenance per month amount has been updated for a RAID device.

Figure 18B:
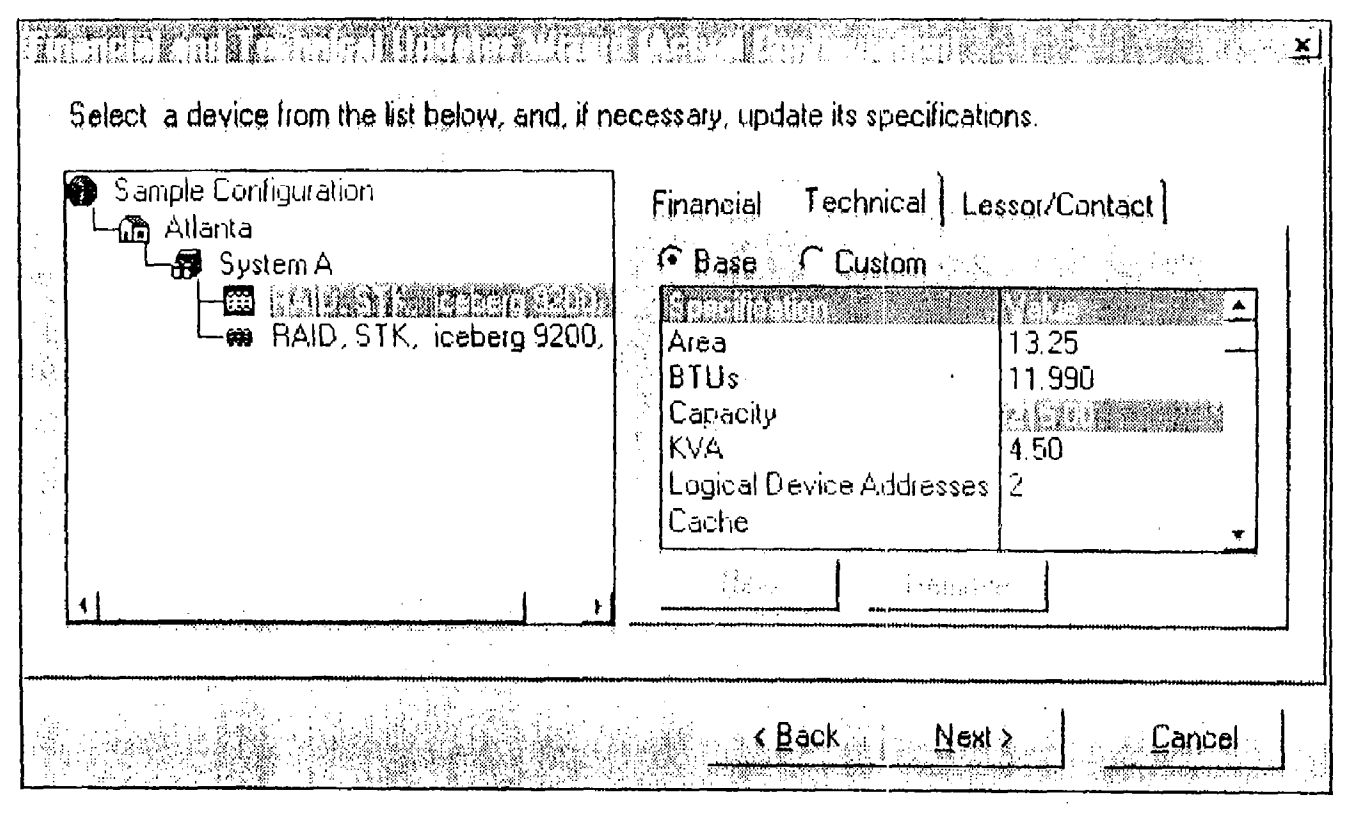

When technical information is to be updated, as step 210 shows, the technical tab is selected at step 212, and the technical data is then updated at step 214. FIG. 18B shows an example where the capacity of a RAID device is updated. The technical information may instead by updated prior to the financial information.

Figure 18C:
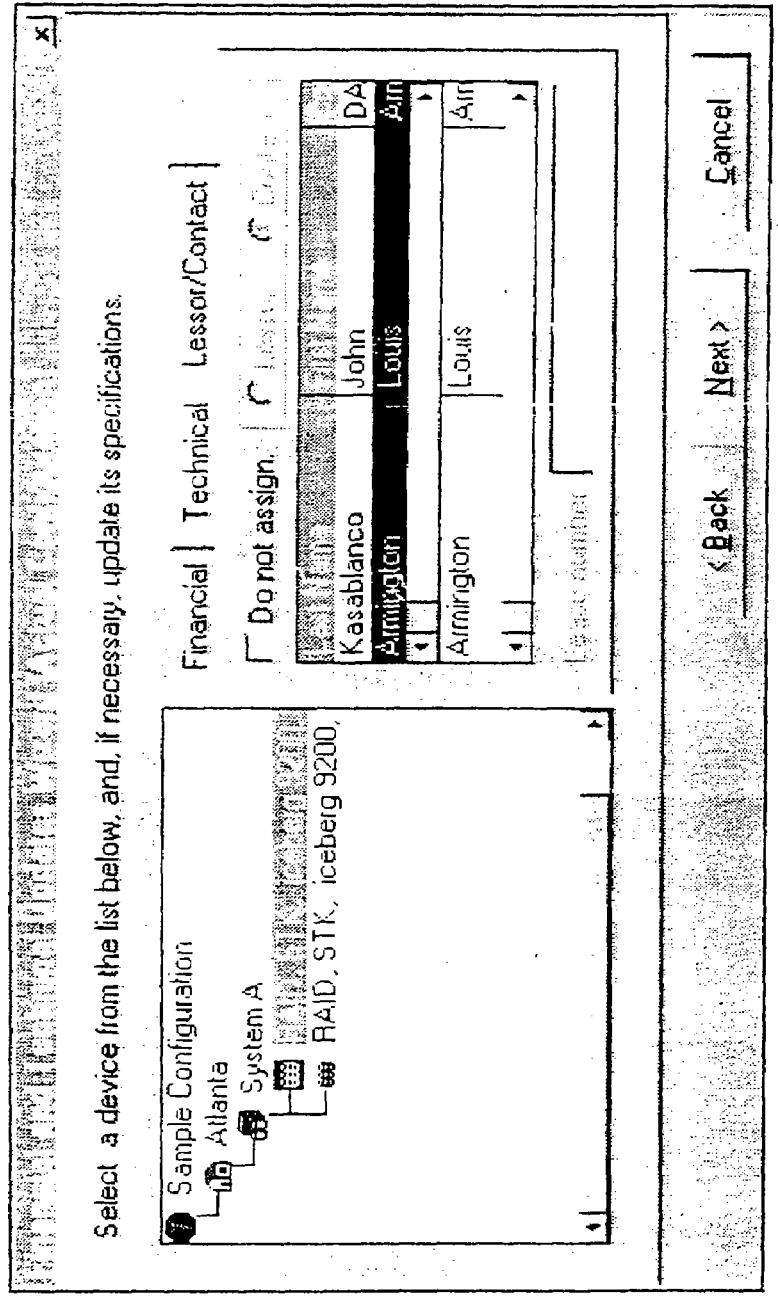

Other data may then be updated, as shown at step 216. The respective transaction is selected at step 218, and the data updated at step 220. FIG. 18C shows an example where the lessor/contact tab has been selected so that the contact information for a RAID device of the configuration is changed.

Figure 19:
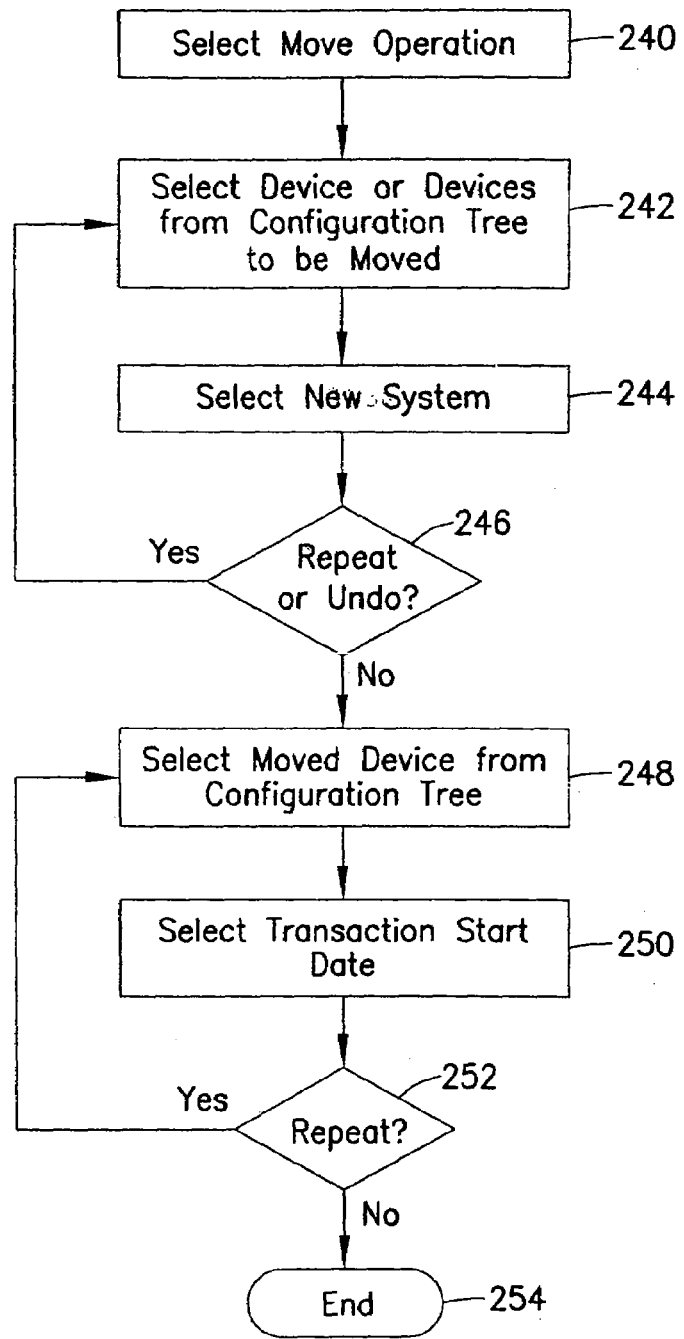
FIG. 19 is a flow chart illustrating the flow of a Move transaction.
Figure 20A:
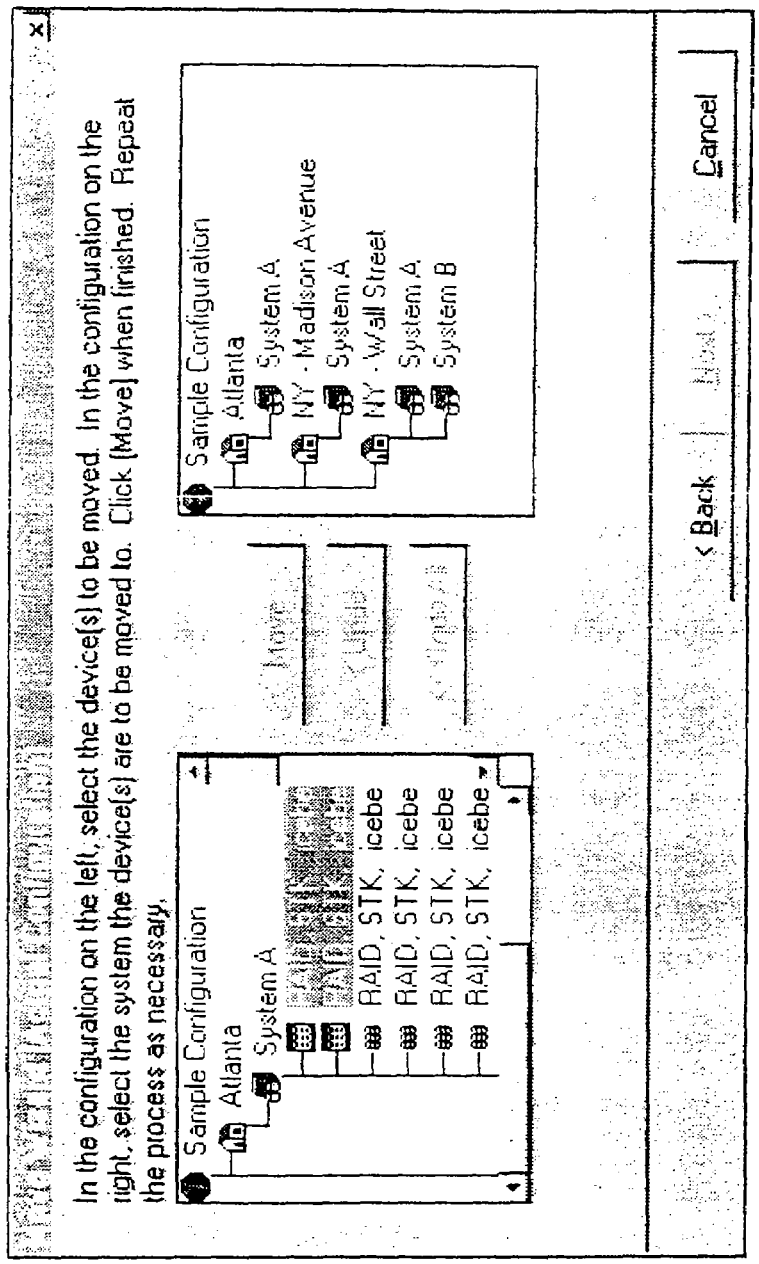
FIGS. 20A–20B show examples of displayed representations of an example of the operation of FIG. 19.
Figure 20B:
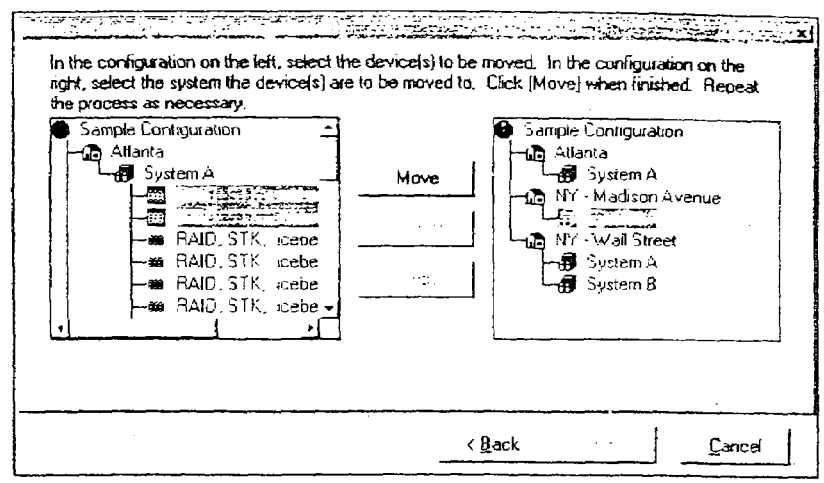

FIG. 19 depicts a flow chart illustrating a transaction in which a device is moved from one system to another. At step 240, the Move Transaction is selected. Then, the device or devices that are to be moved are selected from the configuration tree at step 242, and the system to which the devices are to be moved is selected at step 244. As step 246 shows, steps 242 and 244 may be repeated or undone. FIG. 20A shows an example of step 242 where two RAID devices have been selected, and FIG. 20B shows an example of step 244.

Then, the moved device is selected from the configuration tree at step 248, and the start date for the move is entered at step 250. Steps 248 and 250 are then repeated for each device that is to be moved, as step 252 shows.

Figure 21:
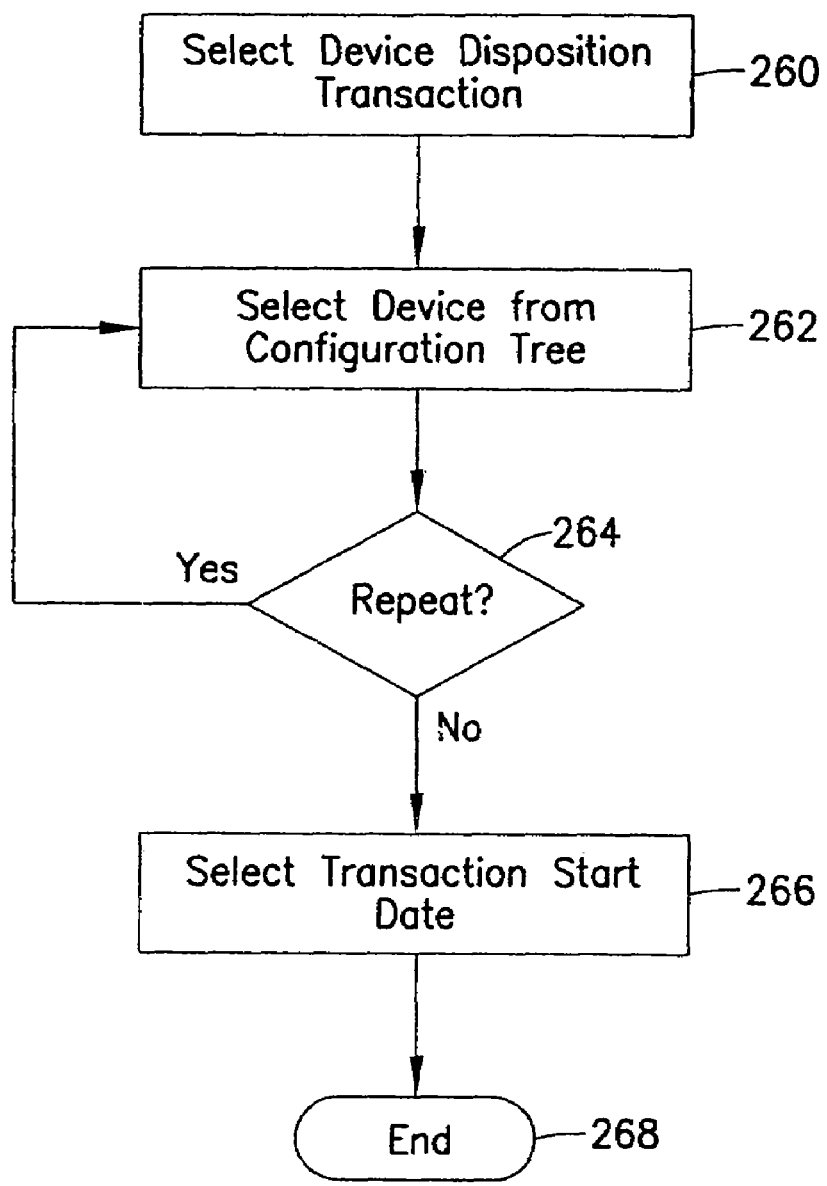
FIG. 21 is a flow chart illustrating the flow of a Device Disposition transaction.

FIG. 21 illustrates a flow chart showing the disposition of a device, namely the termination of the financial and technical life of the device, so that the associated costs and other requirements for the disposition of the device may be determined.

The disposition of a device is distinguished from the deletion of a device. Specifically, a device is deleted when, using the editor 55, all historical records of a device are removed to appear that the device never existed. By contrast, the disposition of a device represents the disposal of an existing device where the historical records of the device remain.

The Device Disposition Transaction is selected at step 260, and then the device that is to be disposed is selected from the configuration tree at step 262. As step 264 shows, step 262 may be repeated for each device to be disposed. Thereafter, the disposal date of the device is selected at step 266.

Significantly, the invention also allows for the creation of proposed changes to a configuration, namely a What-If configuration, so that the effects on the financial and technical requirements of such changes may be determined. The financial and technical specifications of an existing configuration may be compared to a configuration having a proposed change. Alternatively, the financial and technical requirements of two or more proposed configurations may be compared to each other.

As an example, an existing configuration may have several DASD devices whose leases are about to expire, and it is desired that the devices be replaced with higher capacity devices. The existing DASD devices may be replaced with newer, higher capacity DASD devices or, alternatively, the existing devices may be replaced with RAID devices. The invention shows the financial and technical ramifications of the possible change to the existing configuration prior to making any acquisition so that the optimum change may be selected.

In this example, a first What-If configuration is created by copying the existing configuration, disposing the DASD devices whose leases are to expire, and then adding the new DASD devices. A second What-If configuration is created by likewise copying the existing configuration and disposing the DASD devices whose leases will expire, but then adding the RAID devices. The financial and technical specifications of the two What-If configurations may then be compared.

Figure 22A:
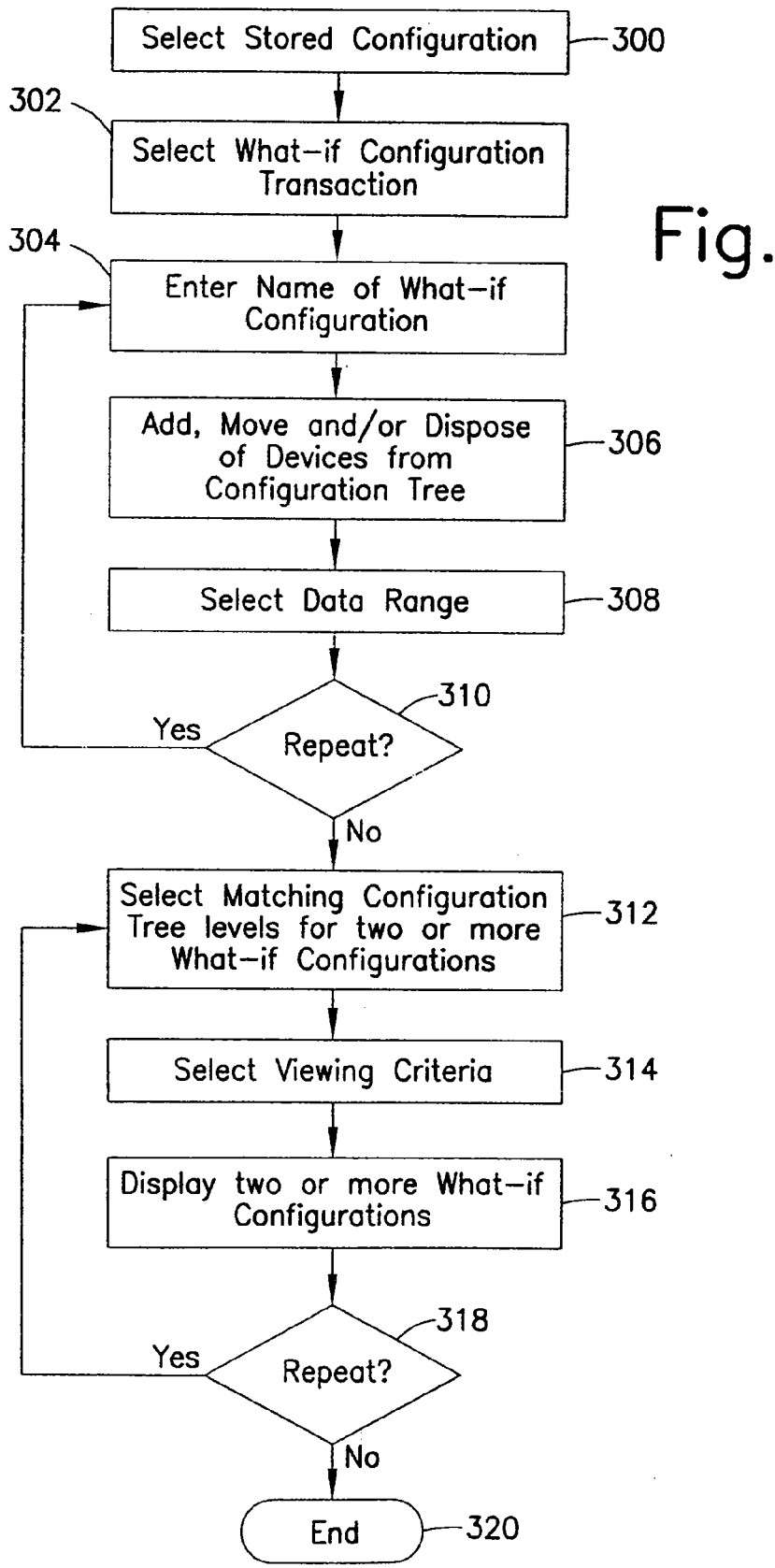
FIG. 22A is a flow chart illustrating the flow of a What-If Configuration transaction.

FIG. 22A is a flow chart illustrating the creation of two or more What-If configurations according to the invention. First, an existing stored configuration is selected at step 300, and the What-If Configuration Transaction is selected as to step 302. Then, at step 304, the name of a What-If configuration is entered, and, at step 306, one or more locations, systems, device groups or devices are added, moved and/or disposed of using the transactions described above regarding FIGS. 13A, 14A, 15A, 15B, 17, 19 and 21. An appropriate date range for the What-If configuration is then selected at step 308. Steps 304 to 308 may be repeated for each respective What-If configuration, as step 310 shows.

Figure 22B:
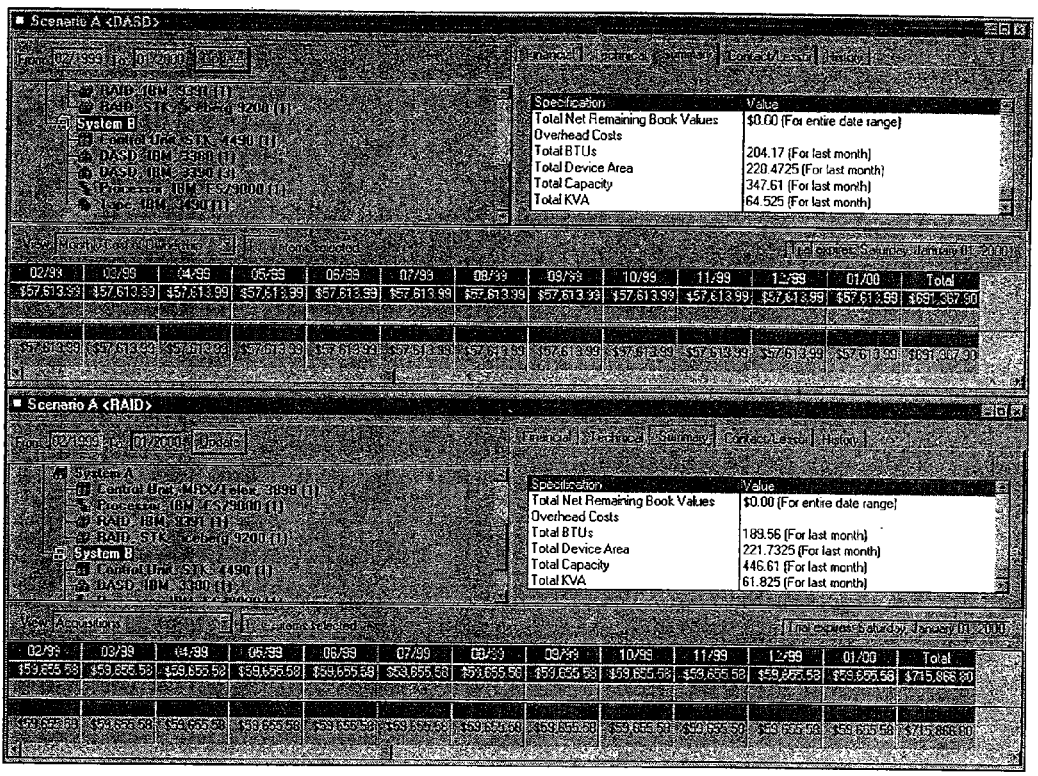
FIG. 22B shows an example of a displayed representation of the operation of FIG. 22A.

Then, the specification of two or more of the newly created What-If configurations may be compared for matching configuration tree levels and matching date ranges. The matching tree levels for two What-If configurations are selected at step 312, and then either the financial, technical, summary, contact/lessor or history tabs is selected at step 314. The selected What-If configurations are then displayed at step 316. Step 312 to 316 may be repeated for each pair of What-If configurations that are to be compared. FIG. 22B shows an example where the summary information of two What-If scenarios are displayed for corresponding date ranges and system levels.

Figure 23:
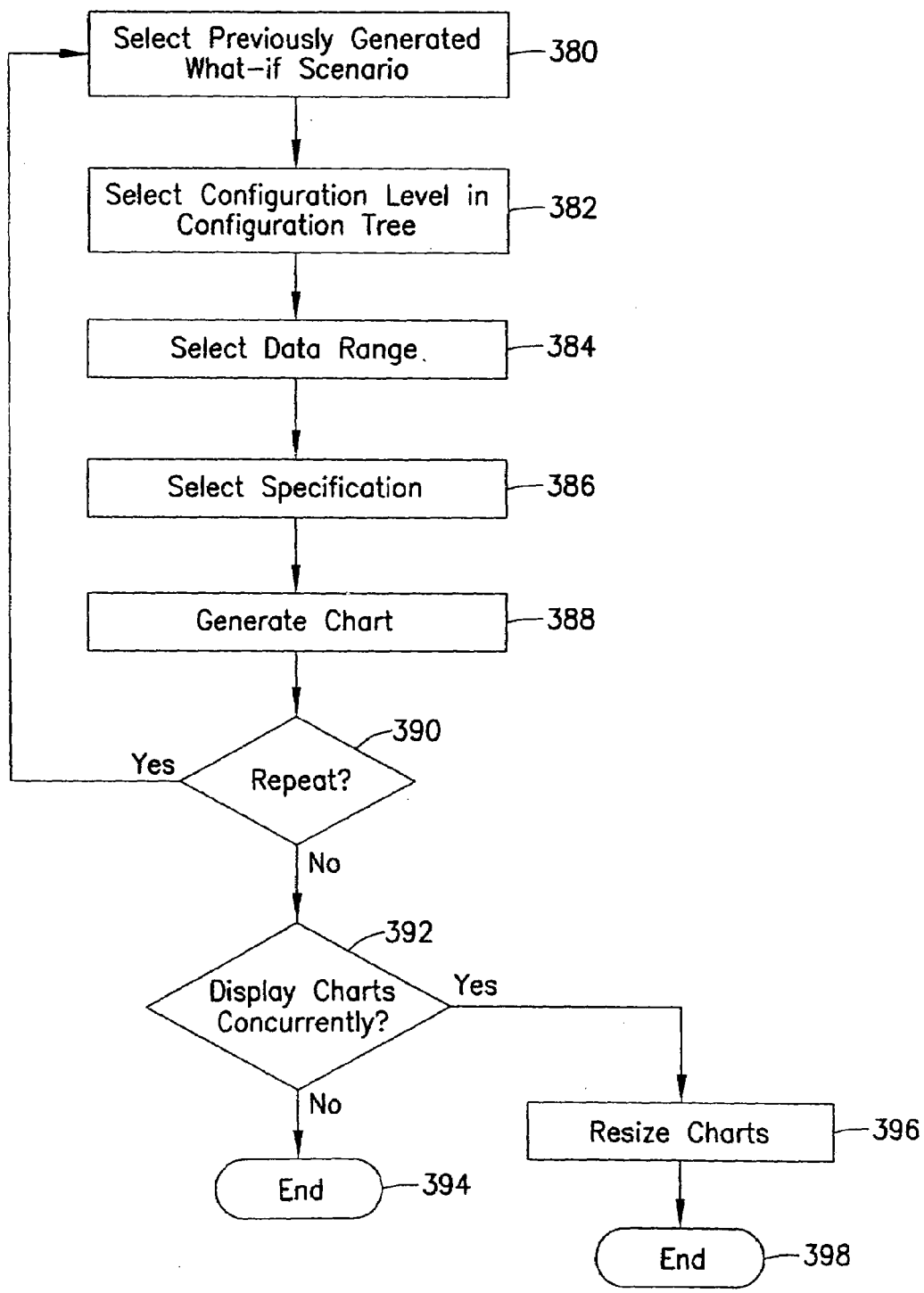
FIG. 23 is a flow chart illustrating the flow of a chart generation operation.

One or more charts representing the financial or technical information of the respective What-If scenarios may be generated, as FIG. 23 shows. Here, one or more previously generated What-If scenarios are selected at step 380, and a configuration level from the configuration tree is selected at step 382. A common date range is selected at step 384, and one of the financial, technical or summary tabs is selected at step 386, and a chart is generated at step 388. Steps 380 to 388 may be repeated for each respective What-If scenario, as step 390 shows.

Then, if it is desirable to display the charts of two or more What-If scenarios concurrently, as step 392 shows, the charts may be resized for concurrent display. FIG. 12 shows an example of two bar charts representing the total capacity of two respective What-If scenarios.

As described above, the invention allows the management of Hardware and Software Data Centers in a substantially automated manner through the use of software which relies on a knowledge base. In creating a configuration whose total cost of ownership needs to be determined, the user is allowed access to computer programs that allow the user to define a particular configuration e.g. its location, device groups, components, costs etc. The information about the financial cost is looked up and/or calculated from information stored in the knowledge base. The information in the knowledge base is often pre-stored in the knowledge base and is provided to a user who purchases the product of the invention. In addition, the information in the knowledge base can be and often is supplemented by information that is supplied by the user. In generating hardware configurations, the invention also provides so called drop-down menus which allow the user to select devices, e.g. CPUs, memory and other storage components from drop-down menus or to individually specify them. If devices or configurations are specified for which pricing information is not available in the knowledge base, such information can be hand entered by the user for reference purposes or estimated by the user for the purpose of obtaining a rough evaluation of the costs of a particular configuration.

It should be noted that the invention may also include information about the personnel costs, such as for systems operation or technical support.

Further, it should be noted that the invention is also applicable to a manufacturing configuration. Here, for example, the configuration may include factories or mills as a second level, machine types as a third level and specific machines or lathes as a fourth level.

As described above, this invention provides decision support capabilities in the planning and operation of a computer enterprise. Namely, the ability to accurately project the actual cost of ownership over time and to forecast the financial and technical effects of making a change of some kind to a current or hypothetical hardware/software configuration.

The preceding description has focused on embodiments that are hardware based. The following is a description of the additional capabilities provided by this invention for managing and projecting the actual costs of ownership over time of software products and a description of the interrelationships of the costs of software products with proposed hardware changes.

Licensing fees are typically determined by the computer on which the software will run. In the personal computer arena, users generally pay a single fixed fee irrespective of the size or speed of their computer. However, as one moves to larger systems possibly composed of servers, multi-user systems and/or mainframes, software licenses terms will vary. In some instances, software prices are based on the number of users, the model of CPU, the speed rating of the CPU or combinations of one or more of these factors. Additionally, these fees or prices may be for a limited period of time, and may include charges for maintenance and support.

The licensing fees charged by vendors for software used by large data centers is most often based upon the size of the CPU that software is run on. Users are either charged a fixed amount according to which of their CPUs fall into a particular class (more commonly known as a "model group") or, they are charged according to the speed (MIPS rating) of a specific CPU. Furthermore, each vendor may use one, both or a combination of these pricing schedules.

There is no common basis or standard definition of a model group. Each vendor may establish his own model group pricing schedules separate and apart from what other vendors may use. For example, the assignee of the present invention, Isogon Corporation, may list seven processor groups for a software product covering all IBM processors and another company may define twenty groups for those same processors.

A typical computer installation may have dozens or even hundreds of active software licenses, each having its own pricing schedule.

By way of example, pricing and model group data are presented further on below in tabulated formats, i.e. tables 1, 2 and 3.

Table 1 presents one vendor's model grouping for selected IBM processors and their corresponding MIPS rating for comparison. Table 2 is a pricing schedule based upon MIPS ratings and Table 3 presents a sample price schedule by model group.

TABLE 1

Sample Model Groups for IBM Processors

| Processor - Model | | MIPS | Group |
|---|---|---|---|
| 3090 | 15T | 16.20 | C |
| 3090 | 17T | 16.20 | C |
| 3090 | 18T | 21.60 | C |
| 3090 | 25T | 27.00 | C |
| 3090 | 28T | 43.20 | C |
| 3090 | 100S | 5.60 | B |
| 3090 | 110J | 7.80 | B |
| 3090 | 120E | 10.00 | C |
| 3090 | 120J | 10.00 | C |
| 3090 | 120S | 7.50 | B |
| 3090 | 150 | 9.80 | B |
| 3090 | 500J | 101.00 | D |
| 3090 | 500S | 90.00 | D |
| 3090 | 600E | 74.00 | C |
| 3090 | 600J | 116.00 | E |
| 3090 | 600S | 103.00 | D |

TABLE 2

Sample MIPS based Pricing Products X & Y

| MIPS range | X $/MIPS | Y $/MIPS | Maintenance & Support |
|---|---|---|---|
| 0–50 | $217 | $325 | 15% of License Fee |
| 50–100 | 217 | 276 | First 12 months are included |
| 100+ | 184 | 276 | for new licenses. |

Note: The rates in Tables 2 and 3 are one-time licensing rates. They are graduated, thus for a 60 MIPS CPU the first 50 MIPS would be at the 0–50 rate and the next 10 MIPS at the 50–100 rate. The model groups shown in Table 3 correspond to those in Table 1.

TABLE 3

Sample Model Group Pricing Product Z

| Model Group | Price | Maintenance & Support |
|---|---|---|
| A | $11,800 | 15% of License Fee |
| B | 15,200 | First 12 months are included for new licenses. |
| C | 20,800 | |
| D | 26,450 | |

When a decision maker is considering a change in hardware configuration or the purchase of some additional hardware, that decision is generally because of growth (in workload) or a consolidation to save money. As hardware costs drop, performance of CPUs increase and maintenance costs escalate, data centers will choose to replace smaller, less powerful CPUs with fewer but more powerful processors. Or, alternatively, they may choose to switch to a sysplex (IBM's clustering) of multiple processors that dynamically balance CPU workloads.

Typically, one is faced with either a new licensing situation or re-licensing of an existing software product multiplied by the number of affected software licenses. For installations having dozens or even hundreds of software licenses, the ability to examine the consequences of hardware changes or optimizations becomes increasingly difficult.

By way of example, a data center may be operating two IBM 3090/28T processors, one processor performing production work and the other primarily supporting software development. Each processor would have software licenses in place according to the mix of products on each CPU. If they then choose to replace these smaller, less powerful processors with a single but larger CPU, say an IBM 3090/500S or 3090/500J, and operate all of their licensed software on it, their licensing costs would increase due to the upgrade fees for all of their licensed software. Though vendor practices differ, upgrade fees are often calculated by subtracting the amount paid for the current license from the list price of a license for the new hardware configuration.

Using the data from Tables 1, 2, and 3, the following is a simple one year comparison for those software products. Present licensing costs are computed on the basis of the production system using product X, the development system using product Y and both systems using product Z. The licensing upgrade costs of moving to either the 500S or the 500J models are computed. The original and new licensing costs are shown in the following table for comparison and because maintenance and support fees are charged as a percentage.

| Software | 3090/28T Prod group C 43.2 MIPS Originally Paid | 3090/28T Dev group C 43.2 MIPS Originally Paid | 3090/500S group D 90.0 MIPS List | 3090/500S group D 90.0 MIPS Upgrade Fee | 3090/500J group D 101. MIPS List | 3090/500J group D 101. MIPS Upgrade Fee |
|---|---|---|---|---|---|---|
| License Fees | | | | | | |
| Product X | $9,374 | — | $19,530 | $10,156 | $21,884 | $12,510 |
| Product Y | — | $14,040 | 27,290 | 13,250 | 30,326 | 16,286 |
| Product Z | 20,800 | 20,800 | 26,450 | 5,650 | 26,450 | 5,560 |
| Total | | | 73,660 | $29,056 | 78,660 | $34,446 |

The user will have to pay upgrade fees for products X & Y that are dramatically increased (in proportion to the MIPS rating of the proposed configuration), and, only one upgrade fee for product Z. The second license for product Z is unnecessary. However, the user will not receive any monetary credit for no longer using it.

Software costs alone are not necessarily the deciding factor. The total cost of ownership is more relevant. In order to determine the financial consequences over time of these proposed configurations, the following tables factor in some representative hardware costs to illustrate ownership costs for one year. The first table is the present configuration which establishes a baseline for comparison. The total cost of ownership (TCO) for the original 3090/28T production and development systems is $873,752.

| | Production System | | | | | | Development System | | | | |
|---|---|---|---|---|---|---|---|---|---|---|---|
| | 3090/28T | | Software Product X | | | Software Product Z | 3090/28T | | Software Product Y | | Software Product Z |
| Month | Lease | Maint | License | Maint | License | Maint | Lease | Maint | License | Maint | License | Maint |
| 1 | 22,500 | 13,500 | | 117 | | 260 | 22,500 | 13,500 | | 176 | | 260 |
| 2 | 22,500 | 13,500 | | 117 | | 260 | 22,500 | 13,500 | | 176 | | 260 |
| . | . | . | . | . | . | . | . | . | . | . | . | . |
| . | . | . | . | . | . | . | . | . | . | . | . | . |
| . | . | . | . | . | . | . | . | . | . | . | . | . |
| 12 | 22,500 | 13,500 | | 117 | | 260 | 22,500 | 13,500 | | 176 | | 260 |
| | 270,000 | 162,000 | 0 | 1,406 | 0 | 3,120 | 270,000 | 162,000 | 0 | 2,106 | 0 | 3,120 |
| TCO | 873,752 | | | | | | | | | | | |

Moving to a consolidated configuration using the model 500S IBM processor, the same 12 month period costs would be as follows:

sysplex of five may involve purchasing three additional licenses at the appropriate costs and paying upgrade fees for the other two.

| | Model 500S Upgrade | | | | | | | |
|---|---|---|---|---|---|---|---|---|
| | 3090/500S | | Software Product X | | Software Product Y | | Software Product Z | |
| Month | Lease | Maint | License | Maint | License | Maint | License | Maint |
| 1 | 39,800 | 21,890 | 10,156 | 244 | 13,250 | 341 | 5,650 | 331 |
| 2 | 39,800 | 21,890 | | 244 | | 341 | | 331 |
| . | . | . | . | . | . | . | . | . |
| . | . | . | . | . | . | . | . | . |
| . | . | . | . | . | . | . | . | . |
| 12 | 39,800 | 21,890 | | 244 | | 341 | | 331 |
| | 477,600 | 262,680 | 10,156 | 2,930 | 13,250 | 4,094 | 5,650 | 3,968 |
| TCO | 780,327 | | | | | | | |

In spite of the increased software costs, the TCO can be reduced to $780,327. For sake of comparison, the decision maker now considers a consolidation to the model 500J. The 12 month cost figures are as follows:

While these examples are necessarily simple for the sake of clarity, one can see that when dozens or even hundreds of software products are involved, this invention becomes a valuable tool in projecting the total cost of ownership.

| | Model 500J Upgrade | | | | | | | |
|---|---|---|---|---|---|---|---|---|
| | 3090/500J | | Software Product X | | Software Product Y | | Software Product Z | |
| Month | Lease | Maint | License | Maint | License | Maint | License | Maint |
| 1 | 42,600 | 23,430 | 12,510 | 274 | 16,286 | 379 | 5,650 | 331 |
| 2 | 42,600 | 23,430 | | 274 | | 379 | | 331 |
| . | . | . | . | . | . | . | . | . |
| . | . | . | . | . | . | . | . | . |
| . | . | . | . | . | . | . | . | . |
| 12 | 42,600 | 23,430 | | 274 | | 379 | | 331 |
| | 511,200 | 281,16 | 12,510 | 3,283 | 16,286 | 4,549 | 5,650 | 3,968 |
| TCO | 838,605 | | | | | | | |

In the case of the IBM model 500J system, the TCO for a single year is only modestly reduced to $838,605.

Other scenarios are possible. A planning decision may consider moving from one or more separate processors to a sysplex of multiple processors that balance workloads. In this instance, multiple licenses of the same software may be involved. For example, moving from two processors to a While this invention can, in most cases, determine and present the monthly costs and TCO of a proposed configuration from information contained in the knowledge base, the invention cannot have a perfect understanding of all possible pricing options. Accordingly, the user is provided with the ability to enter or create custom data for software products and to update information as necessary to ensure that the knowledge base properly reflects the current or proposed configuration.

In summary, the features of this invention relating software management are similar to that provided for hardware. This invention also takes into account those factors peculiar to software licensing. Some of these features are:

Knowledge base contains pricing schedules for software products;

Supports MIPS based pricing;

Supports Model Group pricing;

Contains other relevant configuration data, e.g., vendor, version, maintenance fees, etc.;

Knowledge base can be updated and custom data for software products added;

The user interface can additionally display software product information as part of the system configuration:

Listed as a separate item;

Grouped according to vendor; Note that this is directly analogous to the Device Grouping feature for hardware.

Ability to add or remove a software product from a configuration;

Ability to move a software product from one system to another;

Ability to determine if a multi-product discount is applicable from a vendor;

Ability to perform a pricing comparison of a vendor's software product using both model group and MIPS based pricing when both methods are offered;

Ability to perform what-if scenarios over time to determine the total cost of ownership; and/or Supports conventional purchase/lease pricing, custom pricing; and/or pricing based on the number of users.

Figure 24C:
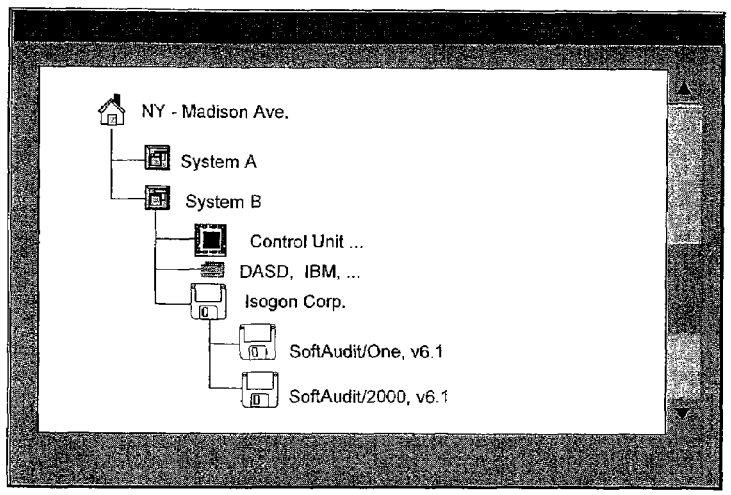

A model computer screen of the invention is shown in FIG. 24C.

While the invention has been described above in relation to the optimization of the management, purchasing and maintenance of hardware and software products, it is to be noted that the asset management invention herein is applicable to and the term "assets" includes at least: real estate, automobiles, computer hardware, computer software, collectibles, stocks, bonds, options, copyrights, trademarks, patents, etc. Thus, for example, the outright purchase of an automobile places few restrictions upon the buyer. In contrast, leasing imposes stringent time limits, payment schedules, insurance requirements, penalties and other obligations upon the lessee. The real estate management firm may own or control numerous properties for which there may exist schedules of maintenance, capital improvements, rents due and payable, statutory requirements (income, real estate and business taxes; permits, licenses, etc.) and other obligations, each of which has one or more agreements establishing terms and conditions. The management, purchasing and optimization system of the present invention provides a tool for handling a diverse selection of "assets" as defined above.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for assessing the financial cost of ownership of a configuration of at least one computer data center defined by a plurality of elements, through the use of systematic, computer assisted procedures, the method comprising the steps of:

a) modeling elements of a data center configuration on a computer by identifying to the computer the elements of a given configuration;

b) providing in a knowledge base financial information which reflects financial ownership costs of the elements associated with a predetermined class of computers, including substantially all of the modelled elements of the given configuration;

c) correlating information stored in the knowledge base with elements of the configuration; and d) outputting at least a portion of the configuration and at least a portion of the associated information to a user.

2. The method of claim 1, including performing the modeling step and the correlating step by means of a substantially automatic software controlled process and said correlating step including calculating the financial ownership costs over selected time periods.

3. The method of claim 2, in which the configuration includes information defining at least one data center location, at least one system within the location, at least one device group within the system, and at least one device within the device group.

4. The method of claim 3, including preparing a respective configuration for a plurality of devices within the location and including moving at least one device from one data center configuration to another.

5. The method of claim 3, including enabling the disposition of the device in a manner such that historical records of the device remain stored in the system.

6. The method of claim 3, including enabling calculating the replacement of at least one device within the device group with one or more other devices to show financial and technical ramifications of such replacement without losing original information stored for a given configuration prior to the replacement step.

7. The method of claim 2, further including altering at least one of a plurality of hardware elements of configuration and substantially automatically recorrelating the altered configuration with information stored in the knowledge base and generating a revised output reflecting the changes to the configuration.

8. The method of claim 2, wherein the modeling step includes modeling software products associated with at least some of hardware elements and the knowledge base includes financial information reflecting the ownership costs of the software products and the outputting step includes displaying of financial information reflecting the cost of using the software products in conjunction with a selected hardware configuration.

9. The method of claim 2, including storing in the knowledge base, for at least a plurality of software products, financial information which reflects ownership costs of the software products related to hardware elements with which the software products are used.

10. The method of claim 9, including calculating ownership costs of the software products based on CPU model groups on which the software products are intended to be used.

11. The method of claim 9, including calculating ownership costs of the software products based on MIPS ratings of CPU hardware elements with which the software products are intended to be used.

12. The method of claim 2, including the step of providing in the knowledge base pre-stored lists of hardware elements and enabling a user to select hardware elements for inclusion in the modeling of said data center configuration.

13. The method of claim 2, including the step of providing in the knowledge base pre-stored lists of software products and enabling the user to select software products for inclusion in the modeling of said data center configuration.

14. The method of claim 2, including calculating the present value of the financial ownership costs modeled over selected time periods.

15. The method of claim 2, wherein said financial ownership costs includes the costs of electrical usage by hardware elements of said at least one computer data center.

16. The method of claim 2, wherein said financial ownership costs includes space costs used by hardware components of said at least one computer data center.

17. An apparatus for managing at least one of hardware and software elements of at least one computer data center, said apparatus comprising:
   a knowledge base that stores information concerning a plurality of the elements;
   a configuration storage that stores at least one configuration that defines at least one location, at least one system within the location, at least one device group within the system, and at least one device within the device group;
   a correlator that correlates information stored in said knowledge base that is associated with essentially each element of said configuration and stores said associated information in said configuration storage; and
   a display generator that generates a display comprising at least a portion of said configuration and at least a portion of said associated information; and
   wherein said associated information stored in said configuration storage includes financial information concerning at least one of the location, system, device group and device of said configuration.

18. The apparatus of claim 17, wherein said associated information stored in said configuration storage includes technical information concerning at least one of the location, system, device group and device of said configuration.

19. The apparatus of claim 17, wherein said associated information stored in said configuration storage includes a summary of financial and technical information of at least one of said location, system, device group and device of said configuration.

20. The apparatus of claim 17, wherein said associated information stored in said configuration storage includes software product information associated with the device of said configuration.

21. The apparatus of claim 17, wherein said associated information stored in said configuration storage includes history information of the device of said configuration.

22. The apparatus of claim 17, further comprising a table generator which generates table information of at least a portion of said associated information for selected ones of said location, system, device group and device of said configuration over a selected time interval; said table information being delivered to said display generator.

23. The apparatus of claim 22, further comprising a chart generator that generates a chart representing the table information for delivery to said display generator.

24. The apparatus of claim 17, further comprising a report generator that generates a report of at least a portion of said configuration and of said associated information over a selected time interval.

25. The apparatus of claim 17, further comprising an editor for editing said configuration and said associated information stored in said configuration storage and for editing the information stored in said knowledge base.

26. The apparatus of claim 17, wherein said display generator includes a facility that enters a name of a new location within said configuration.

27. The apparatus of claim 17, wherein said display generator further includes means for selecting a location within said configuration, and means for entering a name of a new system within said location.

28. The apparatus of claim 17, wherein said display generator includes means for selecting a new device type; means for selecting the system within said configuration where said new device type is to be added; means for adding said new device type to said system; and means for assigning further associated information to said device model.

29. The apparatus of claim 28, wherein said further associated information includes at least one of financial information, technical information, and custom information.

30. The apparatus of claim 17, further including means for selecting a new device type; means for selecting the system within said configuration where said new device type is to be added; means for adding said new device type to said system; and means for assigning further associated information to said device model.

31. The apparatus of claim 30, wherein said further associated information includes at least one of financial information, technical information, and custom information.

32. The method of claim 30, wherein said at least one modification includes disposing of at least one device within said selected configuration.

33. The apparatus of claim 17, wherein said display generator further comprises: means for selecting the device of said configuration that is to be updated; means for selecting a portion of the associated information corresponding to the selected device; and means for updating the portion of the associated information.

34. The apparatus of claim 33, wherein the associated information includes at least one of financial information, technical information, and custom information.

35. The apparatus of claim 17, wherein said display generator includes means for selecting a device that is to be disposed from said configuration; and means for selecting a disposal date.

36. A method of managing at least one of hardware and software elements of at least one data center, said method comprising the steps of:
   storing information concerning a plurality of the elements:
   storing at least one configuration that includes at least one location, at least one system within the location, at least one device group within the system, and at least one device within the device group;
   correlating information that is associated with essentially each element of said configuration and storing said associated information; and
   generating a display comprising at least a portion of said configuration and at least a portion of said associated information.

37. The method of claim 36, wherein said associated information includes financial information concerning at least one of the location, system, device group and device of said configuration.

38. The method of claim 36, wherein said associated information includes technical information concerning at least one of the location, system, device group and device of said configuration.

39. The method of claim 36, wherein said associated information includes a summary of financial and technical information of at least one of said location, system, device group and device of said configuration.

40. The method of claim 36, wherein said associated information includes software product information associated with the device of said configuration.

41. The method of claim 36, wherein said associated information includes history information of the device of said configuration.

42. The method of claim 36, further comprising the step of generating table information of at least a portion of said associated information of selected ones of said location, system, device group and device of said configuration over a selected time interval.

43. The method of claim 42, comprising the step of generating a chart representing the table information.

44. The method of claim 36, further comprising the step of generating a report of at least a portion of said configuration and said associated information over a selected time interval.

45. The method of claim 36, further comprising the step of editing said configuration and said associated information and editing the information concerning said device.

46. The method of claim 36, including adding a new location to the configuration, said adding step comprising the steps of: selecting a new location transaction; and entering a name of a new location within said configuration.

47. The method of claim 36, including adding a new system to the configuration, said adding step comprising the steps of: selecting a location within said configuration; and entering a name of a new system within said location.

48. The method of claim 36, further comprising means for selecting a location within said configuration; and means for entering a name of a new system within said location.

49. The method of claim 36, including adding a new device to the configuration, said adding step comprising the steps of:
  selecting a desired device type;
  selecting the system within said configuration wherein said desired device type is to be added;
  adding said desired device type to said system;
  assigning a device model to said device type; and
  assigning further associated information to the device model.

50. The method of claim 49, wherein said further associated information includes at least one of financial information, technical information, and custom information.

51. The method of claim 36, including updating information in the configuration of at least one data center, comprising the steps of:
  selecting the device of said configuration that is to be updated;
  selecting a portion of the associated information corresponding to the selected device; and
  updating the portion of the associated information.

52. The method of claim 51, wherein the associated information includes at least one of financial information, technical information, and custom information.

53. The method of claim 36, including the step moving a device within the configuration of at least one data center, said step comprising the steps of:
  selecting the device within the system of said configuration that is to be moved;
  selecting another system to which said selected device is to be moved; and
  selecting a date that said selected device is to be moved.

54. The method of claim 53, wherein said display generator includes means for selecting the device of said configuration that is to be moved; means for selecting a new system to which said selected device is to be moved; and means for selecting a date on which the selected device is to be moved.

55. The method of claim 36 including the step of disposing of a device within a configuration of at least one data center; said configuration including at least one location, at least one system within the location, at least one device group within the system and at least one device within the device group; wherein associated information is correlated with each element of said configuration, said disposing step comprising the steps of:
  selecting the device within said configuration that is to be disposed; and selecting a disposal date.

56. The method of claim 36, including modeling proposed changes, said modelling step comprising the steps of:
  selecting an existing configuration;
  performing at least one modification to said existing configuration; and
  selecting a modification date for said modification.

57. The method of claim 56, wherein said at least one modification includes adding at least one device to said selected configuration.

58. The method of claim 56, wherein said at least one modification includes moving at least one device within said selected configuration.

59. The method of claim 56, further comprising the steps of generating another proposed configuration, and generating at least one of a table and a chart for comparing the proposed configuration and the another proposed configuration.

* * * * *